(12) United States Patent
Nishimura et al.

(10) Patent No.: US 9,648,041 B2
(45) Date of Patent: May 9, 2017

(54) SECURITY MANAGEMENT SYSTEM, INPUT APPARATUS, SECURITY MANAGEMENT METHOD, AND RECORDING MEDIUM

(71) Applicants: Yutaro Nishimura, Kanagawa (JP); Susumu Fujioka, Kanagawa (JP)

(72) Inventors: Yutaro Nishimura, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 170 days.

(21) Appl. No.: 14/249,422

(22) Filed: Apr. 10, 2014

(65) Prior Publication Data

US 2014/0310767 A1    Oct. 16, 2014

(30) Foreign Application Priority Data

Apr. 10, 2013   (JP) .................................. 2013-081964
Feb. 27, 2014   (JP) .................................. 2014-037008

(51) Int. Cl.
*G06F 17/00*      (2006.01)
*H04L 29/06*      (2006.01)

(52) U.S. Cl.
CPC ............ *H04L 63/20* (2013.01); *H04L 63/105* (2013.01)

(58) Field of Classification Search
CPC ........ H04L 63/20; H04L 63/105; H04L 29/06
USPC .................................................... 726/1–2, 27
See application file for complete search history.

(56) References Cited

U.S. PATENT DOCUMENTS

| 2003/0140246 | A1* | 7/2003 | Kammer ............. G06F 21/6218 726/35 |
| 2007/0094711 | A1* | 4/2007 | Corley .................... G06F 21/53 726/3 |
| 2009/0193498 | A1* | 7/2009 | Agarwal ........... H04L 29/08846 726/1 |

FOREIGN PATENT DOCUMENTS

JP          2007-185814          7/2007

* cited by examiner

*Primary Examiner* — Evans Desrosiers
(74) *Attorney, Agent, or Firm* — Oblon, McClelland, Maier & Neustadt, L.L.P.

(57) ABSTRACT

A security management system managing security of plural types of client apparatuses which are mutually connected to each other via a network, includes an acquisition unit acquiring or receiving information which is used to change a security level of any of the client apparatuses; a determination unit determining a specific client apparatus whose security setting value is to be changed and a security setting value to be applied to the specific client apparatus, in response to the acquired or received information to change the security level of any of the client apparatuses, based on a definition table defining the security levels of the plural types of client apparatuses; and a notification unit notifying the specific client apparatus of the security setting value to be applied to the specific client apparatus.

17 Claims, 31 Drawing Sheets

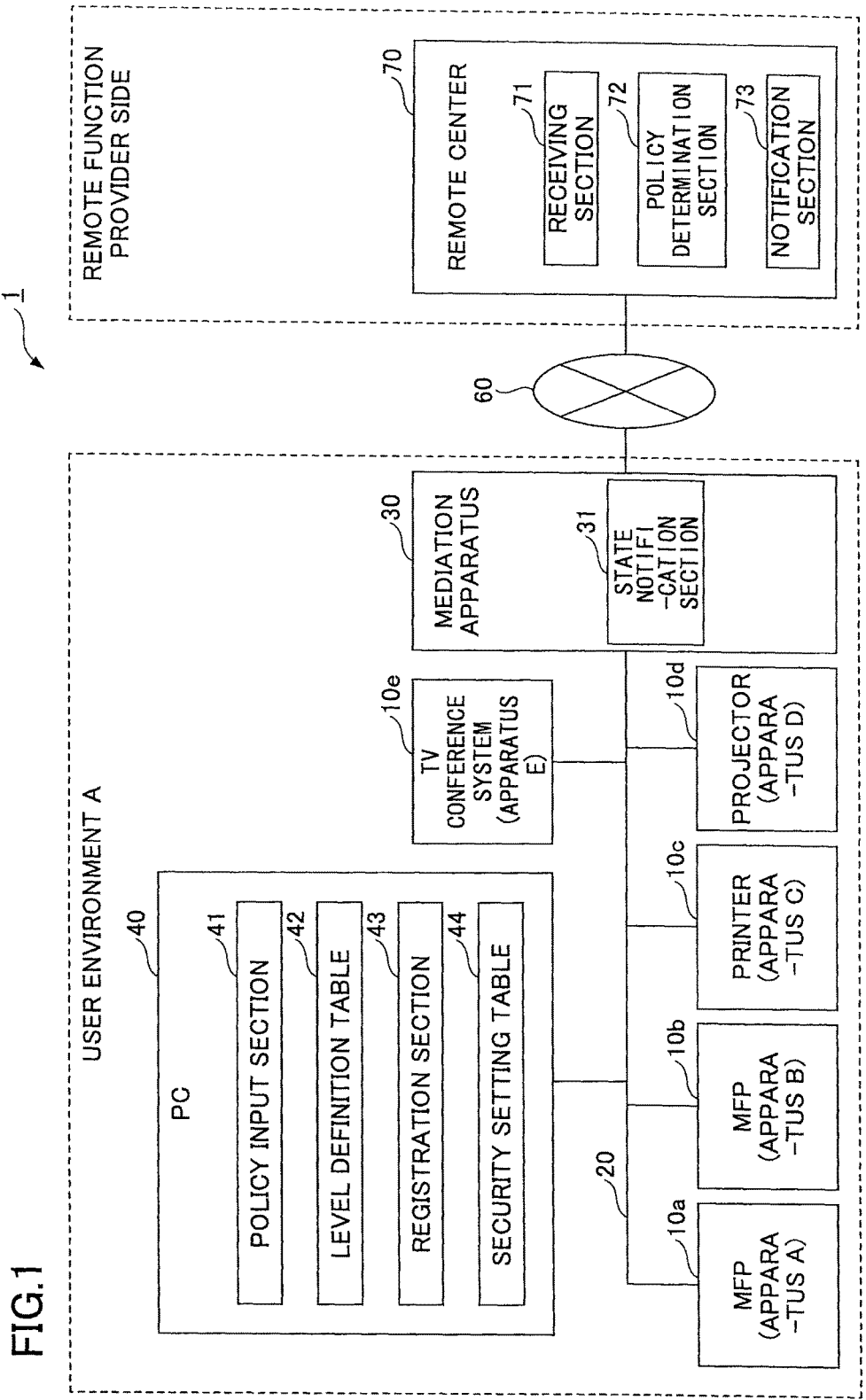

FIG.2A

MFP/PRINTER

| SECURITY LEVEL | USER AUTHENTICATION | HDD AUTOMATIC DELETION | ENCRYPTION STRENGTH |
|---|---|---|---|
| 1 | N/A | N/A | N/A |
| 2 | PASSWORD AUTHENTICATION | AVAILABLE | 512-BIT ENCRYPTION |
| 3 | IC CARD AUTHENTICATION | AVAILABLE (SEQUENTIAL DELETION) | 2048-BIT ENCRYPTION |

FIG.2B

PROJECTOR

| SECURITY LEVEL | USER AUTHENTICATION | HDD AUTOMATIC DELETION | ENCRYPTION STRENGTH |
|---|---|---|---|
| 1 | N/A | — | N/A |
| 2 | PASSWORD AUTHENTICATION | — | 512-BIT ENCRYPTION |
| 3 | IC CARD AUTHENTICATION | — | 2048-BIT ENCRYPTION |

FIG.2C

TV CONFERENCE SYSTEM

| SECURITY LEVEL | USER AUTHENTICATION | HDD AUTOMATIC DELETION | ENCRYPTION STRENGTH |
|---|---|---|---|
| 1 | N/A | — | — |
| 2 | PASSWORD AUTHENTICATION | — | — |

FIG.3

| | | 42f | 42b USER AUTHENTICATION | 42c HDD AUTOMATIC DELETION | 42d ENCRYPTION STRENGTH | |
|---|---|---|---|---|---|---|
| 42e POLICY NO. | | TYPE | | | | |
| 1 | | MFP | LEVEL 3 | LEVEL 3 | LEVEL 3 | } 42a1 |
| | | PRINTER | LEVEL 3 | LEVEL 3 | LEVEL 3 | |
| | | PROJECTOR | LEVEL 2 | — | LEVEL 3 | |
| | | TV CONFERENCE SYSTEM | LEVEL 1 | — | — | |
| 2 | | MFP | LEVEL 3 | LEVEL 3 | LEVEL 3 | } 42a2 |
| | | PRINTER | LEVEL 2 | LEVEL 2 | LEVEL 2 | |
| | | PROJECTOR | LEVEL 1 | — | LEVEL 1 | |
| | | TV CONFERENCE SYSTEM | LEVEL 1 | — | — | |
| 3 | | MFP | LEVEL 2 | LEVEL 2 | LEVEL 3 | } 42a3 |
| | | PRINTER | LEVEL 2 | LEVEL 2 | LEVEL 2 | |
| | | PROJECTOR | LEVEL 1 | — | LEVEL 1 | |
| | | TV CONFERENCE SYSTEM | LEVEL 1 | — | — | |
| 4 | | MFP | LEVEL 1 | LEVEL 1 | LEVEL 1 | } 42a4 |
| | | PRINTER | LEVEL 1 | LEVEL 1 | LEVEL 1 | |
| | | PROJECTOR | LEVEL 1 | — | LEVEL 1 | |
| | | TV CONFERENCE SYSTEM | LEVEL 1 | — | — | |

LEVEL HIGH ← → LEVEL LOW

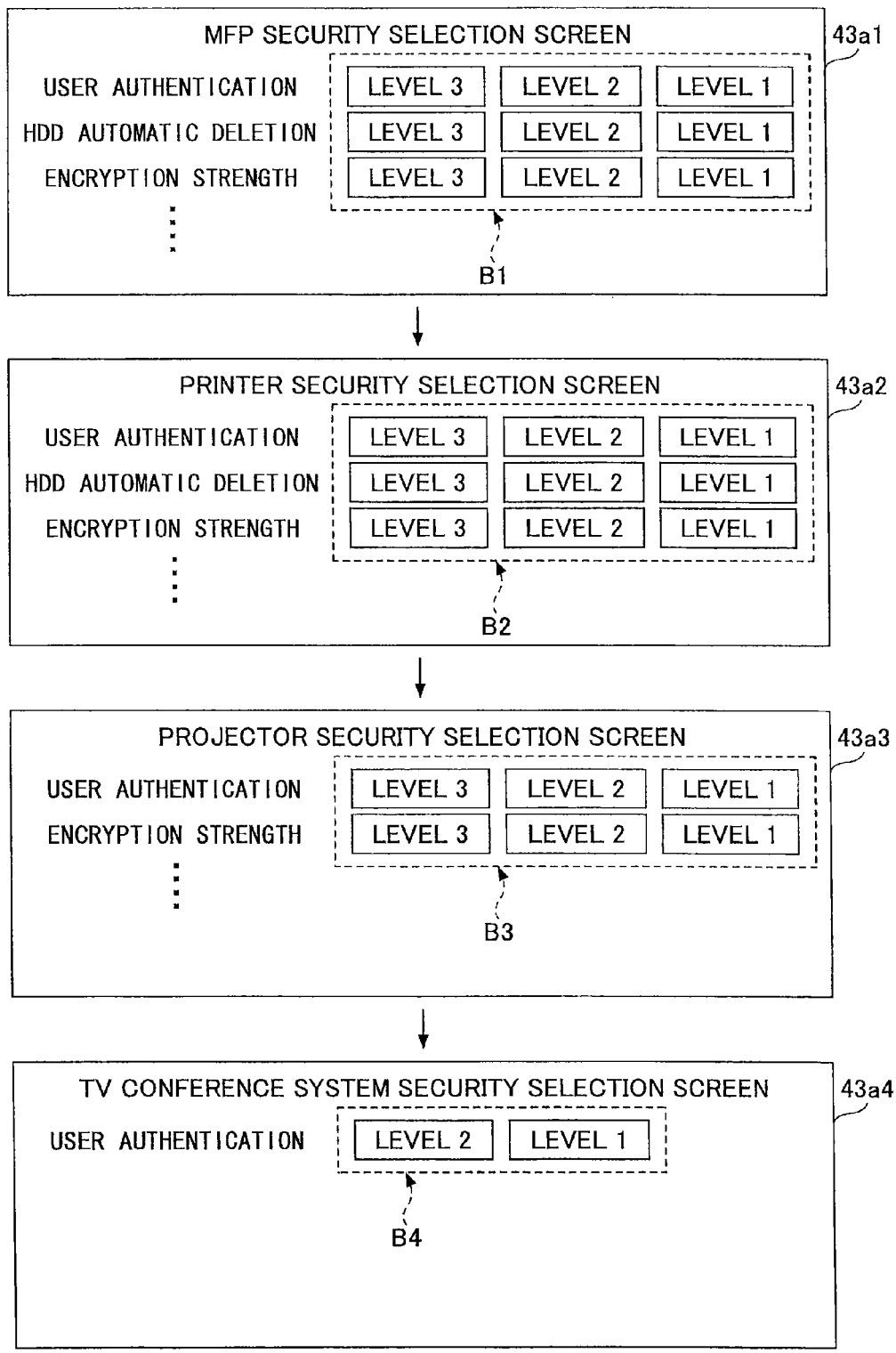

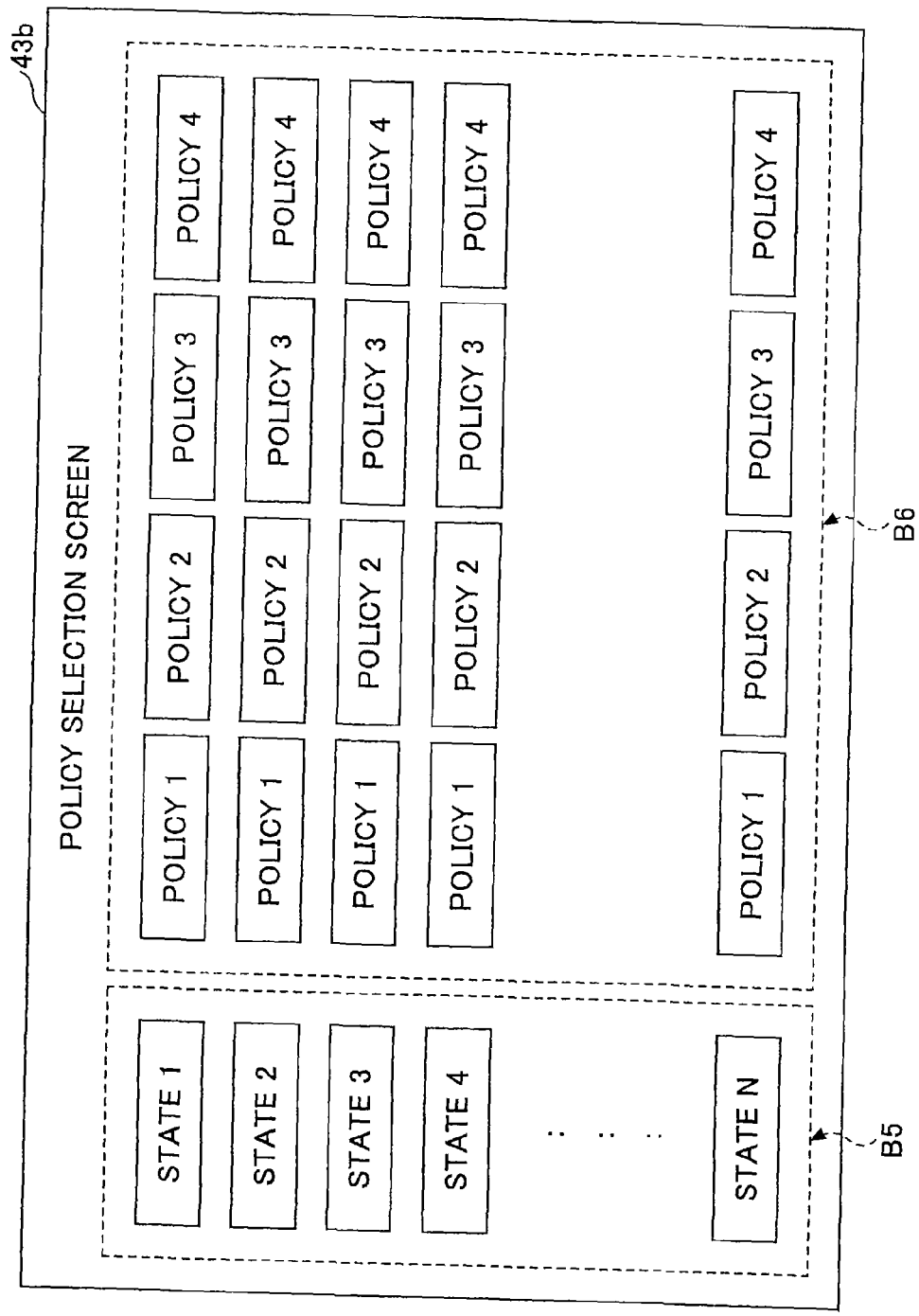

FIG.6

| NO. | POLICY | TRIGGER | EXAMPLE STATE | TRANSMISSION INFORMATION |
|---|---|---|---|---|
| 1 | PLACE OF CONFERENCE ROOM AND LABORATORY | POSITION CHANGE OF APPARATUS | ONLY EMPLOYEE JOINING SPECIAL PROJECT CAN ENTER AND LEAVE | ·ROOM POSITION ·TARGET APPARATUS ·POLICY NO. |
|   |   |   | ONLY EMPLOYEES | ·ROOM POSITION ·TARGET APPARATUS ·POLICY NO. |
|   |   |   | EXTERNAL GUEST ALSO CAN ENTER | ·ROOM POSITION ·TARGET APPARATUS ·POLICY NO. |
| 2 | LIMIT PERSON ENTERING ROOM | CHANGE OF PERSON IN ROOM | ONLY EMPLOYEE JOINING SPECIAL PROJECT CAN ENTER AND LEAVE | ·ROOM POSITION ·TARGET APPARATUS ·POLICY NO. |
|   |   |   | ONLY EMPLOYEES | ·ROOM POSITION ·TARGET APPARATUS ·POLICY NO. |
|   |   |   | EXTERNAL GUEST ALSO CAN ENTER | ·ROOM POSITION ·TARGET APPARATUS ·POLICY NO. |
| 3 | DETERMINED BY USER OF CONFERENCE ROOM OR LABORATORY | USER SELECTS POLICY | — | ·TARGET APPARATUS ·POLICY NO. |
| 4 | POLICY NO. IS SELECTED BASED ON USER'S SELECTION. BUT NOT SELECTED BY USER, POLICY NO. 2 IS AUTOMATICALLY SELECTED |   |   |   |
| 5 | POLICY NO. IS SELECTED BASED ON USER'S SELECTION. BUT NOT SELECTED BY USER, POLICY NO. 1 IS AUTOMATICALLY SELECTED |   |   |   |

FIG.7B

| APPARATUS | TYPE | USER SETTING LEVEL | | |
|---|---|---|---|---|
| | | USER AUTHENTICATION | HDD AUTOMATIC DELETION | ENCRYPTION STRENGTH |
| APPARATUS A | MFP | LEVEL 3 | LEVEL 3 | LEVEL 3 |
| APPARATUS B | MFP | LEVEL 3 | LEVEL 3 | LEVEL 3 |
| APPARATUS C | PRINTER | LEVEL 3 | LEVEL 3 | LEVEL 3 |
| APPARATUS D | PROJECTOR | LEVEL 2 | — | LEVEL 3 |
| APPARATUS E | TV CONFERENCE SYSTEM | LEVEL 1 | — | — |

| APPARATUS | TYPE | USER SETTING LEVEL | | |
|---|---|---|---|---|
| | | USER AUTHENTICATION | HDD AUTOMATIC DELETION | ENCRYPTION STRENGTH |
| APPARATUS A | MFP | LEVEL 3 | LEVEL 3 | LEVEL 3 |
| APPARATUS B | MFP | LEVEL 3 | LEVEL 3 | LEVEL 3 |
| APPARATUS C | PRINTER | LEVEL 2 | LEVEL 2 | LEVEL 2 |
| APPARATUS D | PROJECTOR | LEVEL 1 | — | LEVEL 1 |
| APPARATUS E | TV CONFERENCE SYSTEM | LEVEL 1 | — | — |

44

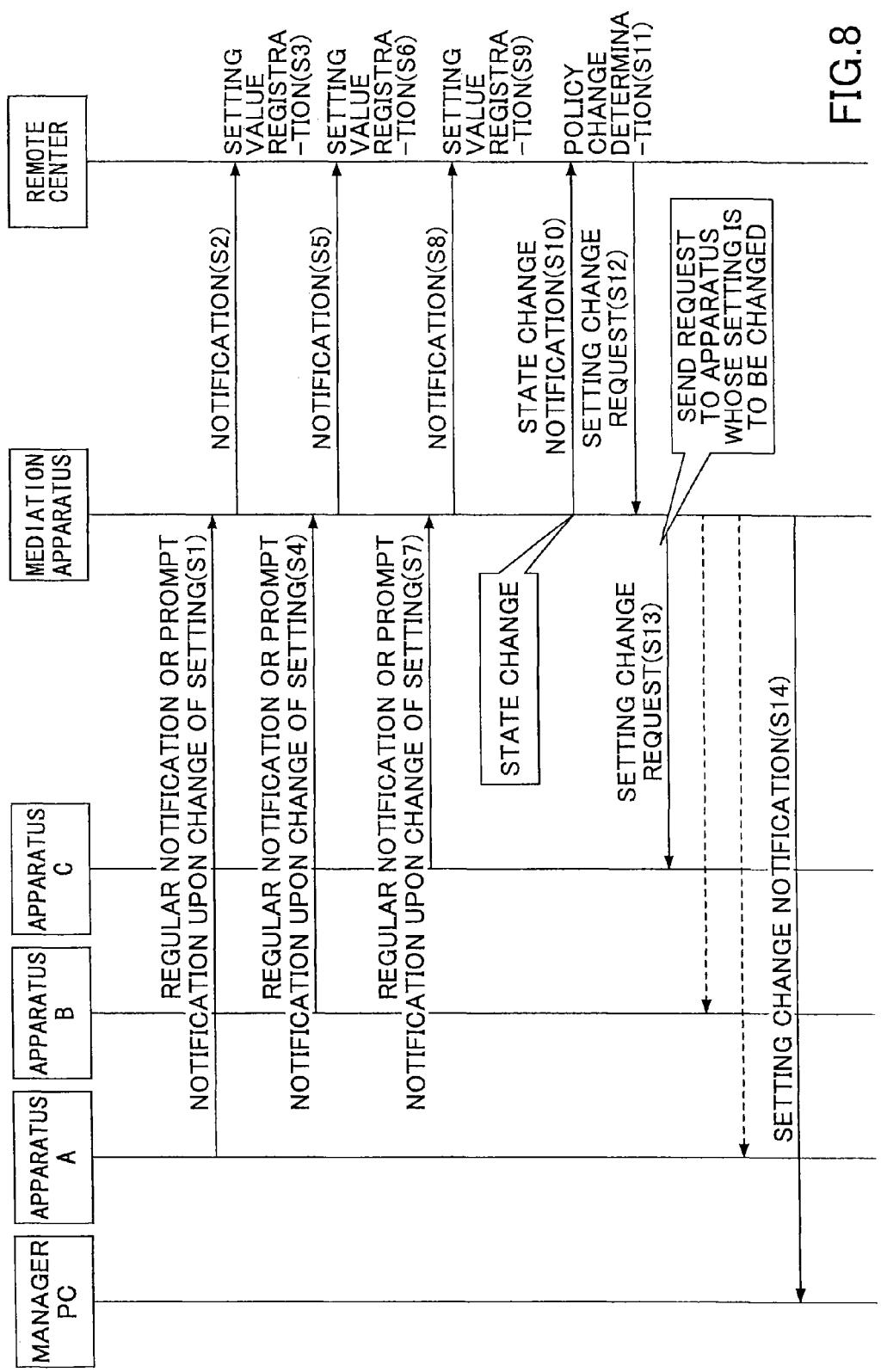

FIG.9

| APPARATUS | TYPE | CURRENT SETTING LEVEL (POLICY NO. 2) | | | SETTING LEVEL AFTER CHANGE (POLICY NO. 1) | | |
|---|---|---|---|---|---|---|---|
| | | USER AUTHEN-TICATION | HDD AUTOMAT-IC DELETION | ENCRYPTION STRENGTH | USER AUTHEN-TICATION | HDD AUTOMAT-IC DELETION | ENCRYPTION STRENGTH |
| APPARATUS A | MFP | LEVEL 3 | LEVEL 3 | LEVEL 3 | LEVEL 3 | LEVEL 3 | LEVEL 3 |
| APPARATUS B | MFP | LEVEL 3 | LEVEL 3 | LEVEL 3 | LEVEL 3 | LEVEL 3 | LEVEL 3 |
| APPARATUS C | PRINTER | LEVEL 2 | LEVEL 2 | LEVEL 2 | LEVEL 3 | LEVEL 3 | LEVEL 3 |
| APPARATUS D | PROJECTOR | LEVEL 1 | — | LEVEL 1 | LEVEL 2 | — | LEVEL 3 |
| APPARATUS E | TV CONFERENCE SYSTEM | LEVEL 1 | — | — | LEVEL 1 | — | — |

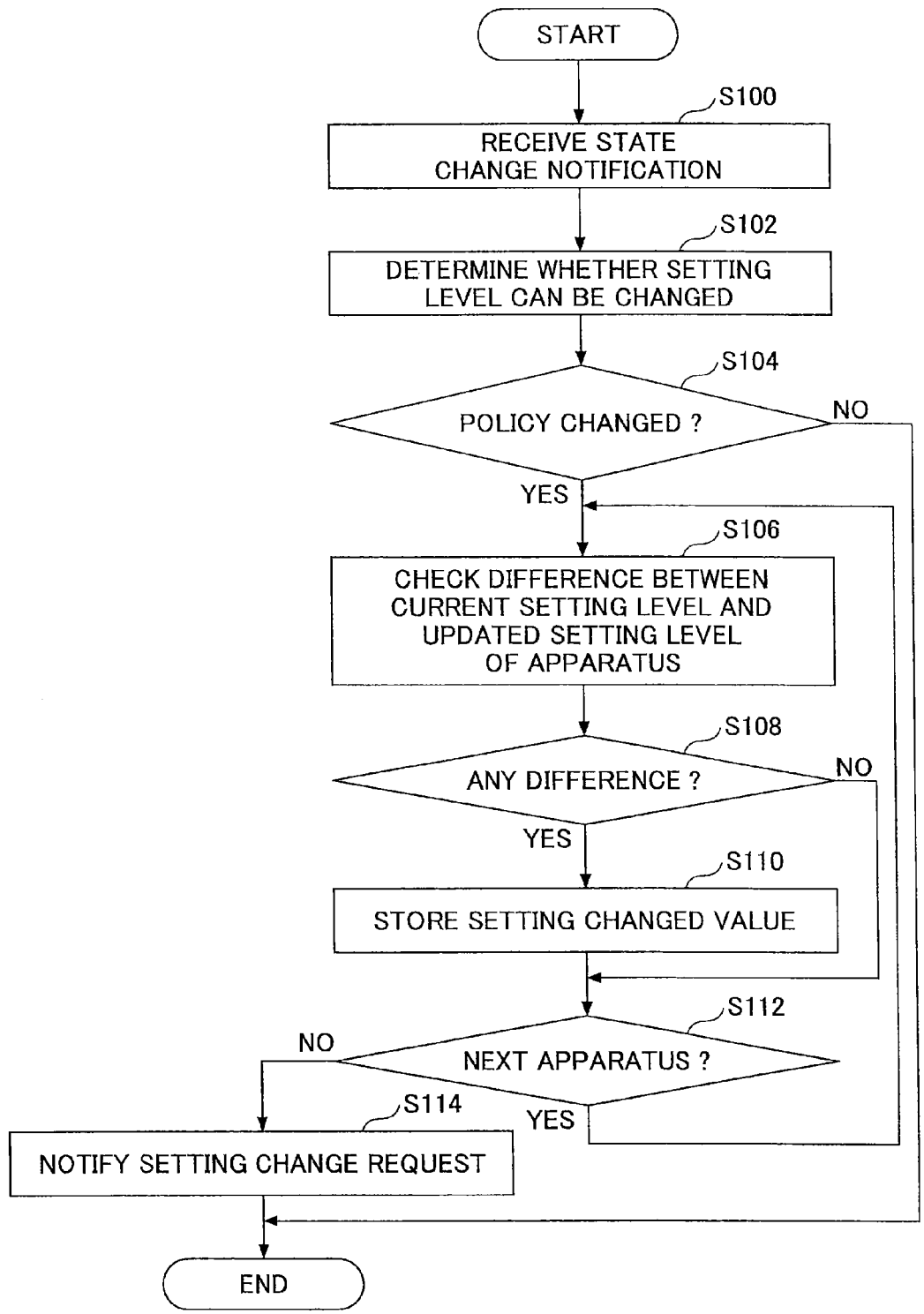

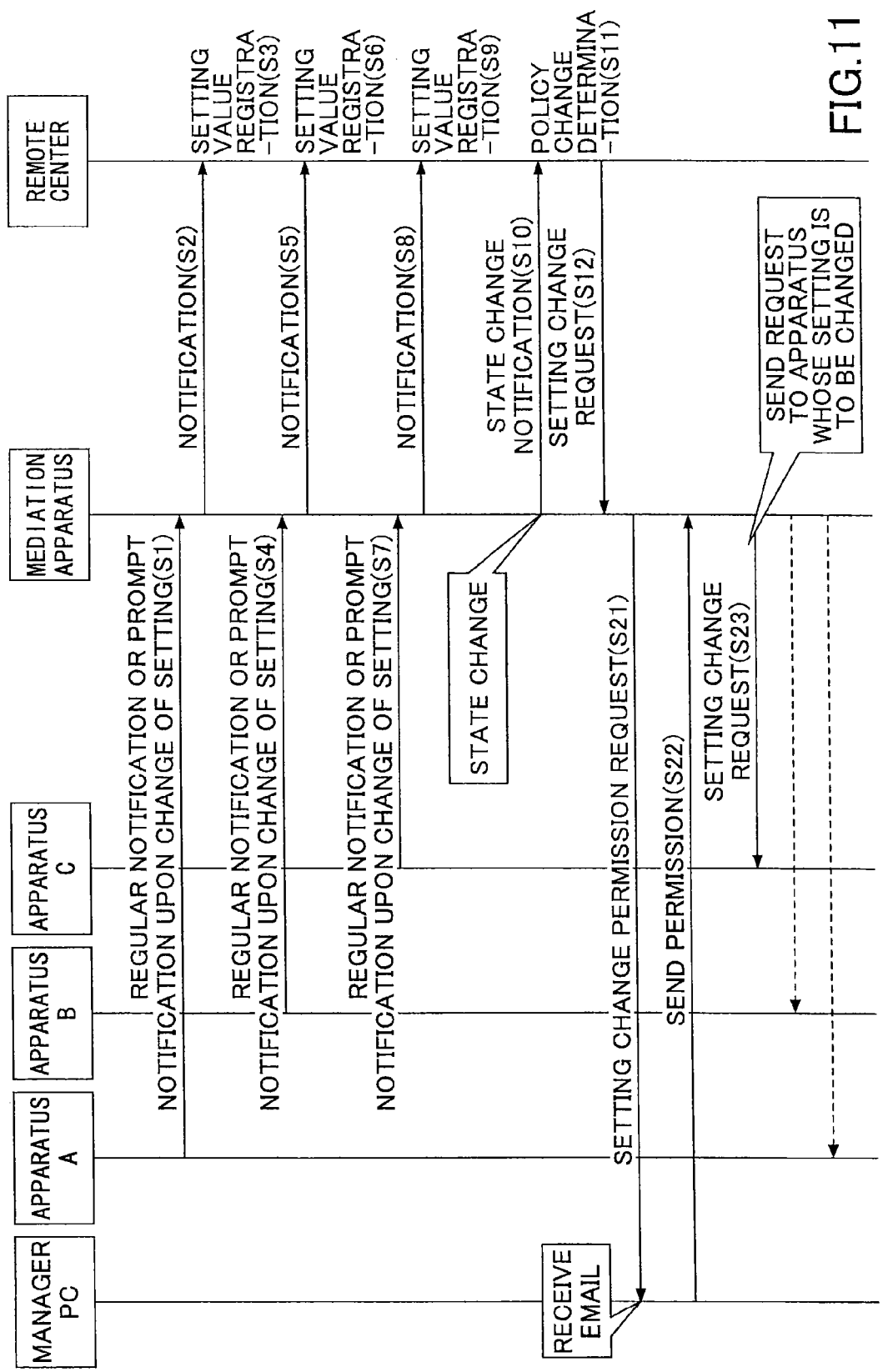

FIG.12

SECURITY SETTING CHANGE PERMISSION REQUEST

TO ACCORD WITH SECURITY POLICY
CHANGE SECURITY SETTING OF APPARATUS C
FROM LEVEL 2 TO LEVEL 3.

APPROVE

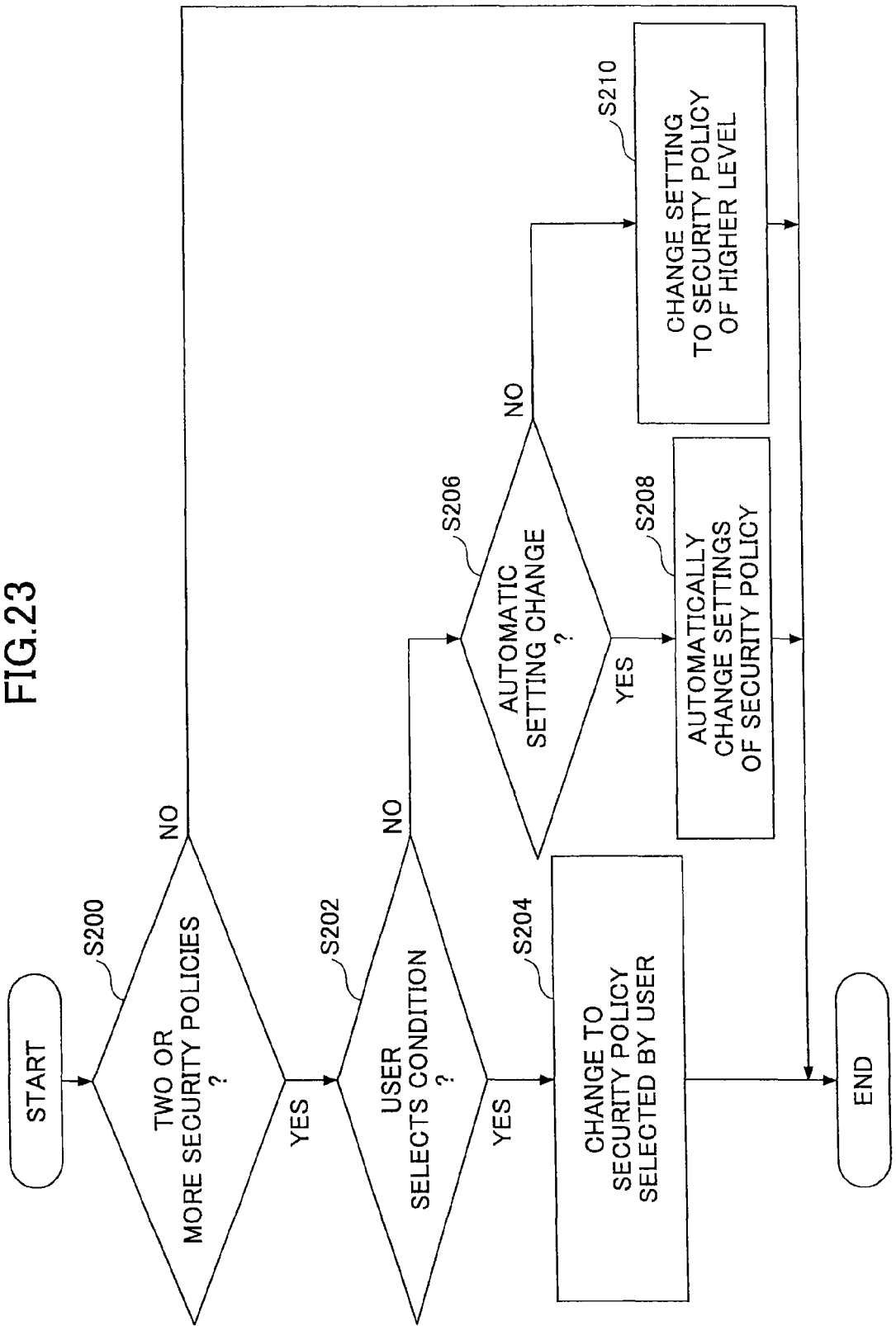

FIG.24A

| MFP/PRINTER SECURITY LEVEL | USER AUTHENTICATION (42a) | HDD AUTOMATIC DELETION (42b) | ENCRYPTION STRENGTH (42c) | ACCESS LOG (42d) | JOB LOG (42e) | AUTOMATIC LOGOUT (42f) | MEDIUM SLOT (42g) | NETWORK PROTOCOL (42h) | LOCKOUT UPON INCORRECT PASSWORD INPUT (42i) | PASSWORD INPUT CHARACTER (42k) |
|---|---|---|---|---|---|---|---|---|---|---|
| 1 | N/A | N/A | N/A | NOT DONE | NOT DONE | NOT DONE | NOT DONE | SET ALL PROTOCOLS VALID | N/A | FOUR OR MORE FIGURES ONLY |
| 2 | PASSWORD AUTHENTICATION | AVAILABLE | 512-BIT ENCRYPTION | DONE | DONE | DONE | NOT DONE | SET FTP, SNMP, HTTP ETC. INVALID | AVAILABLE | FOUR OR MORE ALPHA-NUMERIC CHARACTERS ONLY |
| 3 | IC CARD AUTHENTICATION | AVAILABLE (SEQUENTIAL DELETION) | 2048-BIT ENCRYPTION | DONE | DONE | DONE | DONE | SET ONLY SOME PROTOCOLS VALID | — | EIGHT OR MORE ALPHA-NUMERIC CHARACTERS ONLY |

FIG.24B

PROJECTOR

| SECURITY LEVEL | USER AUTHENTICATION | HDD AUTOMATIC DELETION | ENCRYPTION STRENGTH |
|---|---|---|---|
| 1 | N/A | – | N/A |
| 2 | PASSWORD AUTHENTICATION | – | 512-BIT ENCRYPTION |
| 3 | IC CARD AUTHENTICATION | – | 2048-BIT ENCRYPTION |

FIG.24C

TV CONFERENCE SYSTEM

| SECURITY LEVEL | USER AUTHENTICATION | HDD AUTOMATIC DELETION | ENCRYPTION STRENGTH |
|---|---|---|---|
| 1 | N/A | – | – |
| 2 | PASSWORD AUTHENTICATION | – | – |

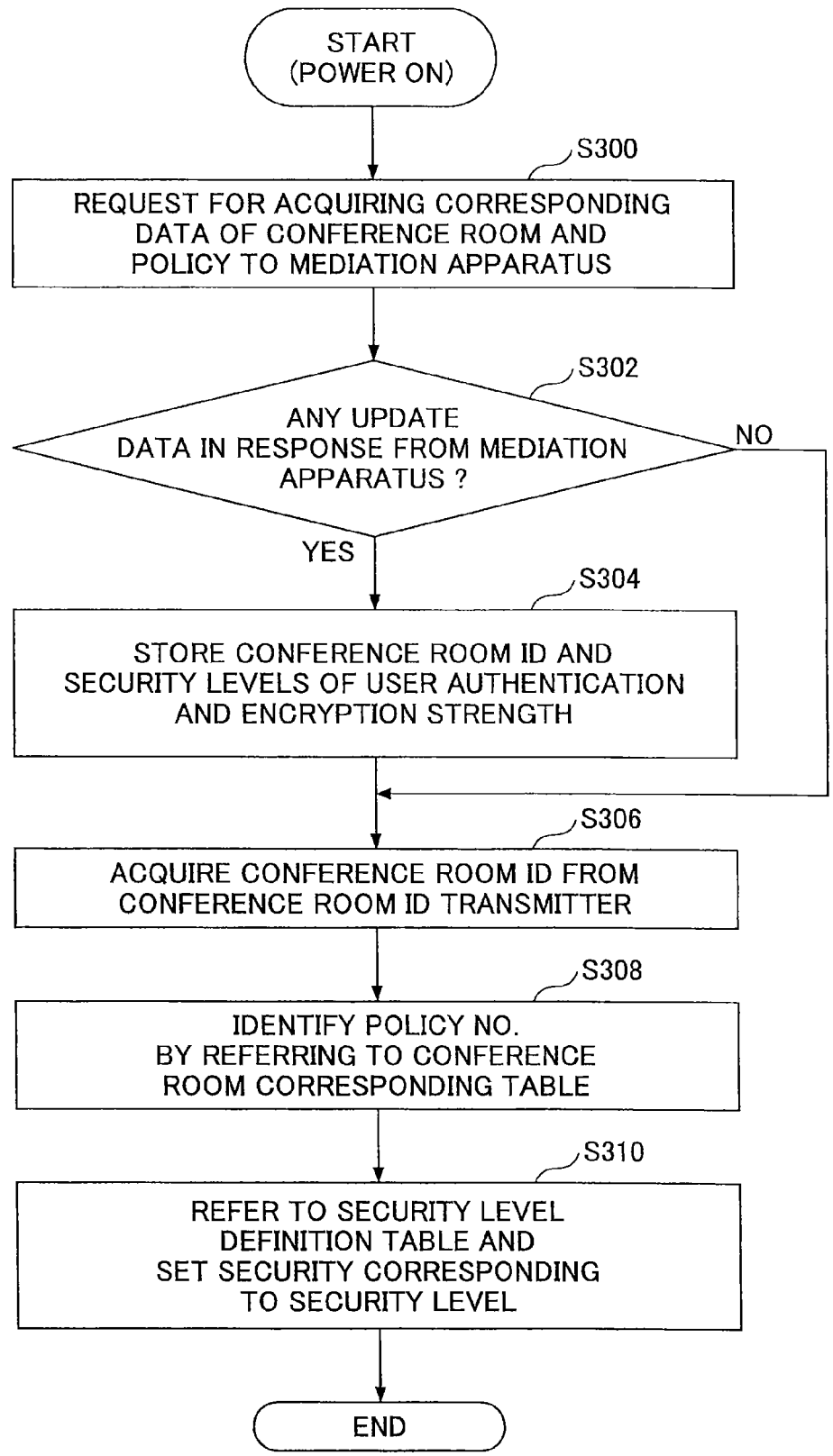

SECURITY MANAGEMENT SYSTEM, INPUT APPARATUS, SECURITY MANAGEMENT METHOD, AND RECORDING MEDIUM

CROSS-REFERENCE TO RELATED APPLICATIONS

The present application is based on and claims the benefit of priority under 35 U.S.C §119 of Japanese Patent Application Nos. 2013-081964 filed on Apr. 10, 2013 and 2014-037008 filed on Feb. 27, 2014, the entire contents of which are hereby incorporated herein by reference.

BACKGROUND OF THE INVENTION

1. Field of the Invention

The present invention generally relates to a security management system, an input apparatus, a security management method, and a recording medium.

2. Description of the Related Art

Recently, with an increased interest in the security of office equipment, various apparatuses to be connected to the Internet have had various security functions installed to fulfill user's requirements. For example, the security functions of a Multifunction peripheral (MFP) include, for example, user authentication, data encryption, automatic deletion of remaining data, open and close of a network protocol, and document access control.

On the other hand, when a type or a supplier of the apparatuses is different, the security resources that apparatuses handle may also be different, so that the setting items of the security may also be different. In such a case, a user may have to separately set the security of the apparatuses based on the respective security policies, and a person in charge of management of the apparatus checks whether the settings of the security are correct. As for a single apparatus alone, there is a known technique in which various security setting values of the apparatus can be collectively set by designating a desired security level from among the security levels which are defined based on the security policy (see, for example, Japanese Laid-open Patent Publication No. 2007-185814).

Specifically, Japanese Laid-open Patent Publication No. 2007-185814 discloses a technique in which, in order to easily set the security level of the apparatus, the apparatus receives security levels based on the security policies from a user and the security specification thereof is stored and managed, so that the relationship is stored therein between the security levels, which have been set in a step-by-step manner and determined based on the security policies, the security level values corresponding to the security levels.

SUMMARY OF THE INVENTION

According to an aspect of the present invention, a security management system managing security of plural types of client apparatuses which are mutually connected to each other via a network, includes an acquisition unit acquiring or receiving information which is used to change a security level of any of the client apparatuses; a determination unit determining a specific client apparatus whose security setting value is to be changed and a security setting value to be applied to the specific client apparatus, in response to the acquired or received information to change the security level of any of the client apparatuses, based on a definition table defining the security levels of the plural types of client apparatuses; and a notification unit notifying the specific client apparatus of the security setting value to be applied to the specific client apparatus.

BRIEF DESCRIPTION OF THE DRAWINGS

Other objects, features, and advantages of the present invention will become more apparent from the following description when read in conjunction with the accompanying drawings, in which:

FIG. 1 illustrates an example configuration of a security management system according to a first embodiment;

FIGS. 2A through 2C illustrate example level definition tables according to first through third embodiments;

FIG. 3 illustrates an example level definition table (security policy) according to first through third embodiments;

FIG. 4 illustrates example screens according to first through third embodiments;

FIG. 5 illustrates an example screen according to first through third embodiments;

FIG. 6 illustrates an example change of the use environment of the office apparatus according to first through third embodiments;

FIGS. 7A through 7C illustrate example security setting tables according to first through third embodiments;

FIG. 8 is an example sequence diagram of an overall security management process according to the first embodiment;

FIG. 9 illustrates a modified example of the security setting table according to first through third embodiments;

FIG. 10 is a flowchart of the security management process according to the first embodiment;

FIG. 11 is an example sequence diagram of an overall security management process according to a first modified example of the first embodiment;

FIG. 12 illustrates an example transmission email to a manager according to the first modified example;

FIG. 23 is a flowchart of a modified example of the security management process when there exist plural setting conditions of the security policy;

FIGS. 24A through 24C illustrate another example of the level definition tables;

FIG. 27 is a flowchart of the security management process according to the fourth embodiment.

DETAILED DESCRIPTION OF THE PREFERRED EMBODIMENTS

Figure 7A:

In the related technologies, it is only within an apparatus that security setting values can be collectively set, and it is not possible to automatically set the security setting values of various types of office apparatuses that are connected to a network.

Further, in the related technologies, for example, the security policy is not changed in accordance with the change of the use environment of the office apparatus, and therefore it is not possible to change the security level depending on the state of the apparatus. Due to this, the security level of any of the apparatuses which are connected to a network is not automatically set to the security level which is to be set in accordance with the change of the state of another apparatus. As a result, the security level may be set, which is lower than the security level that is to be set, so that secret information may be leaked via the network.

The present invention is made in light of the above problem and an example object of the present invention is to automatically set the security setting values of various types of office apparatuses connected to a network.

In the following, preferred embodiments of the present invention are described with reference to the accompanying drawings. Throughout the figures, the same reference numerals are used to describe the same elements and the repeated descriptions thereof may be omitted.

First Embodiment

Overall System configuration

First, a security management system according to a first embodiment of the present invention is described with reference to FIG. 1. FIG. 1 illustrates an example of an overall configuration of the security management system 1 according to a first embodiment. The security management system 1 according to the first embodiment includes apparatuses 10a, 10b, 10c, 10d, and 10e (hereinafter may be collectively referred to as an "office apparatuses 10"), and apparatuses of a remote center (hereinafter simplified as the "remote center 70") which are connected to each other. The security management system 1 sets security setting values of the office apparatuses 10.

Further, there is provided a mediation apparatus 30 between the office apparatuses 10 and the remote center 70. The remote center 70 is disposed at an isolated location from the office apparatuses 10 and manages the security of the office apparatuses 10.

The mediation apparatus 30 is located within a user environment A, and is connected to a plurality of types of the office apparatuses 10 via a company network 20. The company network 20 includes, for example, an office Local Area Network (LAN), and an office Wide Area Network (WAN). The mediation apparatus 30 is connected to the remote center 70 via the Internet 60. The Internet 60 is an example of an external network.

The mediation apparatus 30 notifies the remote center 70 of the various settings of the office apparatuses 10 and the states of the office apparatuses 10. For example, the mediation apparatus 30 notifies the remote center 70 of a toner supply state. Upon receiving the notification, the remote center 70 determines whether the toner remaining is in an end state. Here, the toner remaining is an example only. Namely, it is to be understood that besides the toner remaining, the remote center 70 may also determine whether, for example, the sheets and the staples for the MFP/printer, the remaining life time of the projection lamp for the projector are in their end states. When determining that, for example, the toner remaining is in the end state (or near-end state), the remote center 70 arranges the automatic delivery of the toner supply to a desired office apparatus 10 on the user side. By doing this, it becomes possible for a vendor of the apparatus to automatically supply the toner to the user.

The mediation apparatus 30 includes a state notification section 31. The state notification section 31 notifies the remote center 70 of the security settings of the office apparatuses 10. The state notification section 31 detects a state change by which it is desired to change the setting of the security level ("security setting"), and notifies the remote center 70 of the state change. The state change herein refers to the change of the use environment relative to the office apparatuses 10 and is an example of the information to determine the change of the security level of the client apparatus. Although a specific example thereof is described below with reference to FIG. 6, the state notification section 31 is an example of an acquisition unit acquiring the information to determine to change the security level.

For example, the plural types of office apparatuses 10 include an MFP 10a, an MFP 10b, a printer 10c, a projector 10d, and a video conference system (TV conference system) 10e. The MFP 10a, the MFP 10b, the printer 10c, the projector 10d, and the TV conference system 10e are an example set of the plural client apparatuses which are connected to each other via a network. The client apparatuses are not limited to the set of the plural apparatuses. For example, the office apparatuses 10 may include only a single type of the apparatuses. In the following description, the office apparatuses 10 are distinguished from each other by assuming that the MFP 10a is an apparatus "A", the MFP 10b is an apparatus "B", the printer is an apparatus "C", the projector is an apparatus "D", and the TV conference system is an apparatus "E".

The MFP 10a and the MFP 10b are Multifunctional Peripherals and are examples of the office apparatuses 10. The MFP 10a and the MFP 10b notify the mediation apparatus 30 of the respective security level setting values periodically or upon the change of the setting of the security level.

The printer 10c is an example of the office apparatuses 10. The printer 10c notifies the mediation apparatus 30 of the security level setting value thereof periodically or upon the change of the setting of the security level.

The projector 10d is an example of the office apparatuses 10. The projector 10d notifies the mediation apparatus 30 of the security level setting value thereof periodically or upon the change of the setting of the security level.

The TV conference system 10e is an example of the office apparatuses 10. The TV conference system 10e notifies the mediation apparatus 30 of the security level setting value thereof periodically or upon the change of the setting of the security level.

A personal computer (PC) 40, which is an example of an apparatus that a user (manager) uses, is connected to the company network 20. The apparatus of the user is not limited to the PC 40. For example, the apparatus of the user may be any apparatus, which has a communicating function, such as a tablet type terminal.

The PC 40 includes a policy input section 41, a level definition table 42, a registration section 43, and a security setting table 44, and manages the security settings of the apparatuses on the user's company network 20.

The policy input section 41 provides a screen on which the user (e.g., a manager who manages the office apparatuses 10) can input the security policy within the company network 20. The user interactively selects or collectively selects the setting on the screen so as to input the security policy of the office apparatuses 10 on the company network 20. Namely, by operating the screen displayed on the PC, the user can input the security policy of the plural types of the office apparatuses 10. The input information is transmitted to the remote center 70 via the state notification section 31.

In the level definition tables 42, the security levels of the plural types of the office apparatuses 10 are defined. The security setting table 44 indicates the security setting values of the office apparatuses 10 connected via the company network 20 which are set by the user and the like.

The registration section 43 registers the respective security levels of the plural types of the client apparatuses into the security setting table 44. For example, the registration section 43 registers the security settings of the office apparatuses 10 into the security setting table 44 based on the security policy which is set by the policy input section 41. Here, the registration section 43 may be a function of the mediation apparatus 30.

The PC 40 is an example of an input apparatus that inputs the information to change the security level of the office apparatuses 10 based on the user's operation. To that end, the PC 40 displays a screen where the security levels of the plural types of the office apparatuses 10 defined in the level definition table 42 are selectable (see FIGS. 4A-4C) or a screen where a combination of the security levels ("security policy") is selectable (see FIG. 5). On one of the screens, the user selects the security levels of any of the office apparatuses 10 or the security policy. By using the screens, the user can easily input the change of the security settings of the office apparatuses 10.

The remote center 70 correctively manages the information of the office apparatuses 10 of plural users. The remote center 70 stores the information of the office apparatuses 10 of the users notified by the mediation apparatus 30, and provides a service to the users based on the information. Specifically, the remote center 70 acquires the information of the plural types of the office apparatuses 10 via the Internet, and uses the information to manage the office apparatuses 10 so as to respond to a problem of the office apparatuses 10. Further, by using the acquired information of the office apparatuses 10, the remote center 70 provides a service to supply consumables and the like.

Further, the remote center 70 manages the security of the plural types of the office apparatuses 10. The remote center 70 is disposed on the remote control side to provide remote control. The remote center 70 is generally disposed in the infrastructure which is possessed by a vendor who provides the office apparatuses 10 and the related services. The remote center 70 acquires the information of the security setting table 44 and the security level settings of the office apparatuses 10 via the Internet 60.

The remote center 70 includes a receiving section 71, a policy determination section 72, and a notification section 73. The receiving section 71 receives the information to change the security level of the office apparatuses 10.

Specifically, the receiving section 71 receives the information to identify the change of the use environment relative to the office apparatuses 10 and the input information corresponding to the user operations.

The policy determination section 72 determines the security policy in the office apparatuses 10 in accordance with the change of the state corresponding to the office apparatuses 10 based on the received information to change the security levels.

The notification section 73 notifies the mediation apparatus 30 of the setting change request so as to send a request for the setting change of the office apparatus whose security setting value is to be changed when it is desired to change the security setting value of the office apparatus 10

In the security management system 1 according to this embodiment, the mediation apparatus 30 may be, for example, a proxy server which has a function to connect between the environment of the Internet 60 ("remote function provider side") and the environment of the company network 20 ("user environment A"). The user environment A in this environment is an example of the office environment where the remote center 70 side has the policy determination section 72.

Level Definition Table

Next, the level definition tables 42 according to this embodiment are described with reference to FIGS. 2A through 2C. FIGS. 2A through 2C illustrate examples of the level definition tables 42. In the level definition tables 42 in this embodiment, the security policy is defined for each of the plural types. The security policy herein refers to the defined setting values which are related to one or more securities (security levels) that can be set for each of the plural types. In the office apparatuses 10 connected to the company network 20, a user selects any of the security levels from among the defined one or more security levels. The selected security level is set in the security setting table 44. The user can individually set the security level for each of the plural types.

FIGS. 2A, 2B, and 2C illustrate the defined security policies of the MFP/printer, the projector, and the TV conference system, respectively. For example, in the MFP/printer of FIG. 2A, the security levels 42a are defined for each of the functions (security items) of the user authentication 42b, the HDD automatic deletion 42c, and the network encryption strength 42d. Based on the determined security level 42a, a desired security level is stored upon the use of the MFP/printer.

The user authentication 42b is the function to authenticate whether, for example, a person who is to use the MFP is registered as the user who can use the MFP. The HDD automatic deletion 42c is the function to automatically delete the information stored in the HDD. The network encryption strength 42d is the function to determine whether the data on the network has a predetermined encryption strength.

In the projector of FIG. 2B, the security levels 42a are individually defined relative to the functions of the user authentication 42b and the network encryption strength 42d. The projector has no function of the HDD automatic deletion 42c. The security level 42b related to the HDD automatic deletion 42c is not defined. In the TV conference system of FIG. 2C, the security levels 42a are defined based on the user authentication 42b.

In the level definition tables 42, in addition to the user authentication 42b, the HDD automatic deletion 42c, and the network encryption strength 42d, for example, the state of valid/invalid network protocol, the state of open/close the network port, and the use limitation of the destinations upon the document transmission may also be defined. By using the additional functions, it becomes possible to set the ports, activate/deactivate the network protocol, and the transmission range of document.

In the office apparatuses other than above, there may exist setting values related to different security levels. By defining those security levels and combining the levels among the office apparatuses 10, the level definition tables 42 of FIGS. 2A through 2C are generated (defined).

In the environment where the plural types of office apparatuses 10 are connected to a network, if different policy levels of the office apparatuses 10 are set, the security level of the overall system may be reduced to the lowest security level of the office apparatus 10 on the network. To avoid the problem, it is desired that the security policy of the office apparatuses 10 connected to the company network 20 is uniformly set and managed. Therefore, the above levels are defined. For example, the security policies of the apparatuses are set in a manner such that the level 1 of the MFP/printer is equivalent to the level 1 of the projector.

The user may prefer to collectively set and manage rather than individually set and manage the security levels of the office apparatuses 10. Therefore, it is preferable to provide a scheme to easily set the security policy.

In this regard, as illustrated in FIG. 3, a list where in accordance with the types of the office apparatuses 10, the levels of the security settings are mapped and defined as the security policy may be stored as the level definition table 42. Here, as the policy No. 42e, policies 1 through 4 are illustrated as an example. However, the present invention is not limited to the example configuration.

For example, with respect to each policy No. 42e, the security levels 42a1 through 42a4 including the user authentication 42b, the HDD automatic deletion 42c, and the network encryption strength 42d are defined for each of the types 42f of the plural types.

For example, when the policy No. 1 is selected by a user, the security level of the user authentication 42b is set to level 3 (IC card authentication), the security level of the HDD automatic deletion 42c is set to level 3 (YES, sequential deletion), and the security level of the network encryption strength 42d is set to level 3 (2048-bit encryption). The type of the printer is the same as that of the MFP. Therefore, in the printer, the security levels same as those of the MFP are set. In the projector, the security level of the user authentication 42b is set to level 2 (password authentication) and the security level of the network encryption strength 42d is set to level 3 (2048-bit encryption). In the TV conference system, the security level of the user authentication 42b is set to level 1 (no authentication).

In FIG. 3, the lesser the policy No. is, the higher the security level becomes. Namely, the greater the policy No. is the lower the security level becomes. For example, the policy No. "1" denotes the highest security level, and the policy No. "4" denotes the lowest security level in the example of FIG. 3. The definition of the security policy described above may be done on the remote center 70 side or on the user environment side.

Input of Security Level

In the security management system 1 according to this embodiment, a user interactively inputs the security policy using the PC 40 or the like of the user. By doing this, the setting of the security policy can be changed. FIG. 4 illustrates examples of the interactive (selection) screens to input the security policy. In the selection screens, it is possible to input (set) the security level corresponding to the level definition table 42 where the security levels, which can be input for each of the types or each of the functions of the types, are defined.

In the MFP security selection screen 43a1 which is the first (top) screen of FIG. 4, it is possible to select one of levels 1 through 3 for each of the user authentication 42b, the HDD automatic deletion 42c, and the (network) encryption strength 42d. To select those, for example, the user clicks or touches the buttons in the area B1 on the screen. By doing this, it is possible to easily set the security levels of the user authentication 42b, the HDD automatic deletion 42c, and the (network) encryption strength 42d.

In the same manner, it is possible to set the security levels by, for example, clicking or touching the buttons in the areas B2, B3, and B4 of the printer security selection screens 43a2 (second screen), the projector security selection screen 43a3 (third screen), and the TV conference system security selection screen 43a4 (fourth screen), respectively. In those screens, only the necessary security setting items are displayed. Namely, for example, there is no "HDD automatic deletion 42c" item in the projector security selection screen 43a3, and there are only "level 1" and "level 2" in the "user authentication 42b" of the TV conference system security selection screen 43a4.

The policy determination section 72 changes the security policy (hereinafter may be simplified as "policy") in accordance with the relevant state. To that end, the relationship between the state and the policy is stored. To that end, a policy selection screen 43b as illustrated in FIG. 5 is provided to the user. In the policy selection screen 43b, the user can select the policies B6 for any of the states B5, so that the relationship between the state and the policy can be set.

FIG. 6 illustrates an example of the state. As a case where the security setting value is to be changed, the following example cases (i.e., case Nos. 1 through 3) may be considered. However, the case where the security setting value is to be changed is not limited to those cases. Further, the information indicating the states is desired to detect the change of the use environment of the office apparatuses 10 and (determine to) change the security level of the office apparatuses 10.

1. A case where an apparatus 10 in, for example the conference room or the laboratory is replaced.
2. A case where a person in a predetermined room is changed so that the authority to operate the office apparatus is changed.
3. A case where a person (user, manager) of a room (area) wishes to change the security setting.

The "No. 1" of FIG. 6 illustrates a case where the position of the office apparatus 10 is changed. When the position of the office apparatus 10 is changed, it is desired to set the security level of the office apparatus 10 to the security level corresponding to the position (room, area) after the change (i.e., movement). For example, it may be possible to set a lower security level in a room where only employees can enter. On the other hand, it is desired to set a higher security level in a room where a guide can enter. To identify such information, the state notification section 31 transmits the information items indicating, for example, the position of the room, the target office apparatus 10, and the policy No. as the information to identify the change of the use environment to the policy determination section 72.

Further, the mediation apparatus 30 identifies the position of the room where the office apparatuses 10 are disposed by the following method. In the following description, it is assumed that the office apparatuses 10 are the portable projector 10*d* and the TV conference system 10*e* and that the room is a conference room.

On the ceiling of the conference room, there is a mounted conference room ID transmitter including a Bluetooth (registered trademark) module therein. When the power of the projector 10*d* including its Bluetooth module therein is turned on, the projector 10*d* starts a connection sequence based on the Bluetooth standard with the conference room ID transmitter on the ceiling of the conference room. Then, in the inquiry procedure of the connection sequence, the projector 10*d* transmits an "LMP_name_req PDU" signal (i.e., ID inquiry signal) to the conference room ID transmitter. Upon the receipt of the "LMP_name_req PDU" signal, the conference room ID transmitter sets the conference room ID to the name fragment parameter of the "LMP_name_res PDU" signal and transmits the signal to the projector 10*d*. Upon the receipt of the "LMP_name_res PDU" signal, the projector 10*d* transmits the conference ID along with the apparatus ID thereof to the mediation apparatus 30.

The TV conference system 10*e* also includes its Bluetooth module therein, so that when the power of the TV conference system 10*e* in the conference room is turned on, the TV conference system 10*e* starts the connection sequence based on the Bluetooth standard with the conference room ID transmitter on the ceiling of the conference room. Then, similar to the above, the TV conference system 10*e* receives the conference ID from the conference room ID transmitter. Then, the TV conference system 10*e* transmits the conference ID along with the apparatus ID thereof to the mediation apparatus 30.

The mediation apparatus 30 already has the data of the apparatus IDs of the office apparatuses 10 in association with the respective conference room IDs which have been sent from the office apparatuses 10. Therefore, when determining that the notified conference room ID of the office apparatus 10 is different from the conference room ID stored before, the mediation apparatus 30 determines that the office apparatus 10 has moved to a conference room other than the conference room where the office apparatus 10 was disposed before.

The "No. 2" of FIG. 6 illustrates a case where the security policy is determined based on the authority of the person in the room. Further, the "No. 2" of FIG. 6 illustrates a case where the security policy is determined by the person who uses the conference room or the laboratory.

In the case of "No. 4" or "No. 5", a person who uses the conference room or the laboratory determines the security policy, but otherwise the method of "No. 2" or "No. 1" is selected.

In the case of "No. 2" of FIG. 6, in order to identify the person in the room, it is possible to register the information based on a personal authentication IC card acquired when the person enters the room, so that the policy can be determined based on the person entering the room and the authority of the person.

Figure 19:
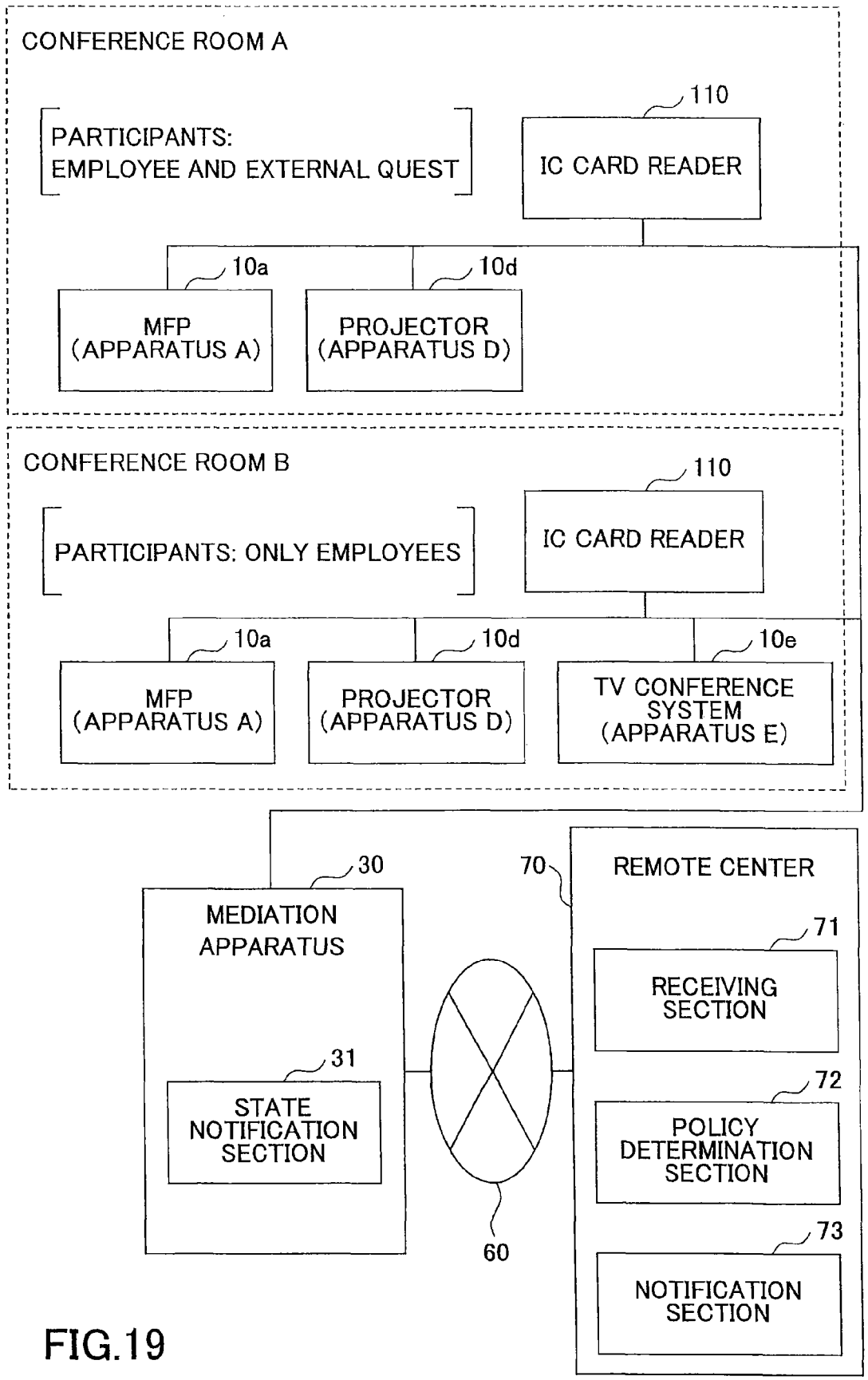
FIG. 19 illustrates a specific example of security management according to an embodiment.

As an example thereof, a case is described where an IC card reader to read the employee ID from the personal authentication IC card is installed at each of the conference rooms (near the entrance area thereof), and the employee ID read by the IC card reader is transmitted to the mediation apparatus 30. FIG. 19 illustrates an example system configuration in this case.

In the conference room A, there are an IC card reader 110, and the MFP 10*a* and the projector 10*d* as the office apparatuses 10, and an employee and an external guest participate in the conference. Here, the employee has an IC card storing his/her employee ID, and the guest has an IC card storing the ID defined for a guest. The IC card for the guest is given to the guest at the reception area. The persons who will participate in the conference (conference participant) place their IC cards on the IC card reader 110 installed near the entrance of the conference room A when the conference participants enter the conference room A. By doing this, the IC card reader 110 reads the employee ID and the ID for a guest (guest ID) from the respective IC cards. Then, the IC card reader 110 transmits the read employee ID and the guest ID along with the conference room ID to the mediation apparatus 30. Here, the conference room ID is registered in the IC card reader 110 in advance.

Upon receipt of the data, the mediation apparatus 30 transmits the received employee ID and the guest ID along with the conference room ID to the remote center 70. The policy determination section 72 of the remote center 70 detects (determines) that both the employee and the guest are in the conference room A, and selects the policy No. 1 which corresponds to the highest security level. Then, the notification section 73 of the remote center 70 transmits a setting change request, which sends a request for setting all the security levels of the user authentication 42*b*, the HDD automatic deletion 42*c*, and the network encryption strength 42*d* of the MFP 10*a* in the conference room A to the security level 3, to the mediation apparatus 30.

The mediation apparatus 30 transfer the message (request) to the MFP 10*a* in the conference room A. Upon receipt of the message, the MFP 10*a* in the conference room A changes (sets) the setting parameters of the user authentication 42*b*, the HDD automatic deletion 42*c*, and the network encryption strength 42*d* to the security level setting value based on the instructed (received) message.

Further, the notification section 73 of the remote center 70 transmits a setting change request, which requests for setting the security level of the user authentication 42*b* and the network encryption strength 42*d* of the projector 10*b* in the conference room A to the security level 2 and the security level 3, respectively, to the mediation apparatus 30. The mediation apparatus 30 transfers the message (request) to the projector 10*d* in the conference room A. Upon receipt of the message, the projector 10*d* in the conference room A changes (sets) the setting parameters of the user authentication 42*b* and the network encryption strength 42*d* to the security level setting values based on the instructed (received) message.

In the conference room B, there are the IC card reader 110, and the MFP 10*a*, the projector 10*d*, and the TV conference system 10*e* as the office apparatuses 10, and only employees participate in the conference. The conference participants place their IC cards on the IC card reader 110 installed near the entrance of the conference room B when the conference participants enter the conference room B. By doing this, the IC card reader 110 reads the employee IDs from the respective IC cards. Then, the IC card reader 110 transmits the read employee IDs along with the conference room ID to the mediation apparatus 30. Here, the conference room ID is registered in the IC card reader 110 in advance.

Upon receipt of the data, the mediation apparatus 30 transmits the received employee IDs along with the conference room ID to the remote center 70. The policy determination section 72 of the remote center 70 detects (determines) that only employees are in the conference room B, and selects the policy No. 4 which corresponds to the lowest security level. Then, the notification section 73 of the remote center 70 transmits a setting change request, which requests for setting all the security levels of the user authentication 42b, the HDD automatic deletion 42c, and the network encryption strength 42d of the MFP 10a in the conference room B to the security level 1, to the mediation apparatus 30.

The mediation apparatus 30 transfers the message (request) to the MFP 10a in the conference room B. Upon receipt of the message, the MFP 10a in the conference room B changes (sets) the setting parameters of the user authentication 42b, the HDD automatic deletion 42c, and the network encryption strength 42d to the security level setting values based on the instructed (received) message.

Further, the notification section 73 of the remote center 70 transmits a setting change request, which requests for setting the security level of both the user authentication 42b and the network encryption strength 42d of the projector 10b in the conference room B to the security level 1, to the mediation apparatus 30. The mediation apparatus 30 transfers the message (request) to the projector 10d in the conference room B. Upon receipt of the message, the projector 10d in the conference room B changes (sets) the setting parameters of the user authentication 42b and the network encryption strength 42d to the security level setting value based on the instructed (received) message.

Further, the notification section 73 of the remote center 70 transmits a setting change request, which requests for setting the security level of the user authentication 42b of the TV conference system 10e in the conference room B to the security level 1, to the mediation apparatus 30. The mediation apparatus 30 transfers the message (request) to the TV conference system 10e in the conference room B. Upon receipt of the message, the TV conference system 10e in the conference room B changes (sets) the setting parameter of the user authentication 42b to the security level setting value based on the instructed (received) message.

Further, the remote center 70 manages an employee ID for a dispatched employee and an employee ID for a person who participates a joint project with another company. Therefore, when such an employee also participates in a conference as a member of the conference, the remote center 70 select the security policy No. in accordance with the security level in such a use environment.

In the above description, a case is described where the remote center 70 determines the policy. However, the present invention is not limited to this configuration (method). For example, the mediation apparatus 30 may determine the policy and transmit the determined policy to the remote center 70.

Security Setting Table

Next, the security setting table 44 is described. FIGS. 7A through 7C illustrate examples of the security setting tables 44. In the security setting table 44, the security level is set for each of the functions of the office apparatuses 10 based on the level definition table 42 of FIGS. 2A through 2C defining the security levels of the office apparatuses 10.

In FIG. 7A, specific security levels of the office apparatuses 10 (i.e., apparatuses A through E in the case of FIG. 1) connected to the company network 20 are set in the security setting table 44. Here, the type of the MFP 10a is the same as the type of the MFP 10b. Therefore, it is desired that the security levels of the apparatus A are the same as those of the apparatus B.

Further, a user can easily change the setting of the security level. For example, FIGS. 7B and 7C illustrate the security setting tables 44 where the policy No. 1 and No. 2 in FIG. 3, respectively, are selected.

Security Management Process

Next, an operation of the security management system 1 according to this embodiment is described with reference to FIG. 8. FIG. 8 is an example sequence diagram of a security management process according to the first embodiment. FIG. 8 illustrates an overall system flow in the user environment A of FIG. 1 to determine whether to change the security policy by the remote center 70. Here, the management PC of FIG. 8 refers to an information apparatus used for using and managing the system by a user (manager).

The remote center 70 accesses the apparatuses A through E via the mediation apparatus 30, but does not directly access the apparatuses A through E. Therefore, the apparatuses A though C notify the mediation apparatus 30 via the company network 20 of the respective security levels thereof at predetermined timings (e.g., at a predetermined time every day), or as soon as the security levels thereof are changed (step S1, S4, and S7).

The mediation apparatus 30 notifies the remote center 70 via the Internet 60 of the notified security levels of the apparatuses A through C (steps S2, S5, and S8). Generally, the mediation apparatus 30 collects the information indicating the security levels reported from the apparatuses A through C, and transmits the collected information to the remote center 70 at a single transmission. By doing this, the communication traffic load can be reduced. The information reported from the apparatuses A through C may include type identification information to identify the type of the apparatuses as well as the security levels. Further, the information reported from the apparatuses A through C may further include the apparatus identification information to identify the apparatuses.

The remote center 70 registers the security setting values of the apparatuses (step S3, S6, and S9).

The state notification section 31 of the mediation apparatus 30 monitors the state change of the office environment where the mediation apparatus 30 is connected. When such a state change as illustrated in FIG. 6 is detected, the state notification section 31 notifies the remote center 70 of the detection and the information indicating the state change of the office environment (step S10).

The receiving section 71 of the remote center 70 receives the information indicating the state change of the office environment, and the policy determination section 72 determines whether to change the policy and decides which (how) security setting value of which apparatus is to be changed (step S11). The notification section 73 notifies the mediation apparatus 30 of the determination result, and requests for changing the settings of the office apparatus 10 whose security setting values is to be changed (step S12).

The mediation apparatus 30 notifies the office apparatus 10 whose security setting values is to be changed of the setting change request (step S13). Further, the mediation apparatus 30 sends an email reporting the change of the security setting values to the PC of the manager (step S14).

The notification of the setting change may be sent by an email to the manager as described above or may be displayed on the screens of the office apparatus (PC screen, operation panel of MFP), or may be recorded as security log information in the log information of any of the office apparatuses.

For example, a case is described where the policy is changed from the policy No. 1 to the policy No. 2 due to a state change with reference to FIG. 9. The current setting level 44a corresponds to the policy No. 2. Namely, the current setting levels of the apparatuses A through E correspond to the setting levels 44a of the policy No. 2. Here, the security setting is changed into the setting levels 44b of the policy No. 1 on the right-hand side of FIG. 8.

In this case, when the policy is changed from the policy No. 2 to the policy No. 1, the setting levels of the apparatuses A, B, and E remain but the setting levels of the apparatuses C and D are changed. Therefore, based on this table, the policy determination section 72 determines that the security setting values of the apparatuses C and D are to be changed, and the notification section 73 sends the setting change request to the determined apparatuses C and D.

Operations of Remote Center 70

The operations of the remote center 70 from the reception of the state change to the notification of the setting change request are described with reference to the flowchart of FIG. 10. Here, the operations of the policy determination section 72 of the remote center 70 are mainly described.

When the receiving section 71 receives the notification indicating the state change from the mediation apparatus 30 (step S100), the policy determination section 72 interprets the content of the notification. For example, in a case where an office apparatus in a conference room is to be used, it is thought that the security level of the office apparatus is to be changed depending on the authorities of the participants of the conference. In this case, the policy determination section 72 receives the information indicating the conference participants, and determines the policy corresponding to the information from among the policies defined in the level definition table 42 of FIG. 3 (step S102).

Next, the policy determination section 72 determines whether any of the setting values based on the determined policy is changed from the setting values set in the security setting table 44 at this timing (step S104). When determining that no change is detected, the policy determination section 72 terminates this process without executing anything more.

On the other hand, when determining that the determined policy is different from the policy which is currently set, it is desired to change the security setting value of the apparatus based on the difference. To that end, when determining that it is desired to change in step S104, the policy determination section 72 checks whether it is desired to change the security setting values for each of the apparatuses. Namely, for example, in the case where the policy is changed from the current setting levels (i.e., policy No. 2) into the new setting levels (i.e., policy No. 1) as illustrated in FIG. 9, the policy determination section 72 checks (determines) whether it is desired to change the security settings of the apparatuses A through E one by one (step S106). Namely, the policy determination section 72 checks the difference between the current setting levels and the new setting levels, and when determining that there exists a difference therebetween (YES in step S108), the policy determination section 72 stores the setting change values of the apparatus (step S110). When no difference is detected, the process goes to the process in step S112 without executing anything. The policy determination section 72 repeats the process of steps S106 through S112 for all the apparatuses to determine whether to change the security settings for each of the apparatuses. Finally, when determining that all the apparatuses are checked (NO in step S112), the policy determination section 72 collectively transmits the stored security setting change values as the setting change request to the mediation apparatus 30 (step S114). By collectively transmitting the change values of the security setting to the mediation apparatus 30, it becomes possible to reduce the number of transmissions and accordingly reduce traffic on the Internet 60.

As described above, the security management system 1 according to this embodiment may provide a scheme in which a user can set the security policy to the various apparatuses connected to the office network. Further, by storing the relationships between the security policy and the corresponding security settings and determining in advance which security policy is to be set (set value) depending on the use state of the office apparatuses, it becomes possible to automatically change the security setting values based on the set value. By doing this, it becomes possible to collectively and automatically set the security level based on the security policy which is determined in accordance with the state of the use environment of the plural types of the office apparatuses 10 connected to a network.

In the above embodiment, a case is described where only employees participate in the conference in the conference room B and the policy No. 4 whose security level is the lowest is selected, so that the security levels of the MFP 10a, the projector 10d, and the TV conference system 10e are set based on the selection.

In this case, after the conference, if, for example, a guest comes into the conference room B without placing the IC card on the IC card reader 110 along with an employee to participate another conference, the guest may use the MFP 10a, the projector 10d, and the TV conference system 10e where the lowest security levels are still set.

Therefore, a case is described where the security levels of the MFP 10a, the projector 10d, and the TV conference system 10e are set to the highest security level after a conference is finished.

First, the remote center 70 stores the employee IDs in association with the conference room ID, the employee IDs of the employees being received when the employees enter the conference room B. After the conference where only the employees participate is finished, the participants place the IC cards on the IC card reader 110 installed near the entrance of the meeting room B when going out from the conference room B.

The IC card reader 110 reads the employee IDs from the IC cards and transmits the read employee IDs and the conference ID to the mediation apparatus 30. Upon receiving the data, the mediation apparatus 30 transfers the employee IDs and the conference ID to the remote center 70.

The remote center 70 determines whether the received employee IDs correspond to the employee IDs which are stored when the employees entered the conference room B before. When determining that all the employee IDs of the employees who entered the conference room B before and participated in the conference are also received after the conference is finished, (i.e., when the remote center 70 determines that all the employees who enter the conference room B to participate in the conference go out from the conference room B after the conference based on the received data from the IC card reader 110 on which all the participants place their IC cards when entering and going out from the conference room B), the policy determination section 72 of the remote center 70 selects the policy No. 1 which is the highest security level.

Then, the notification section 73 of the remote center 70 transmits the setting change request, which requests for setting the security levels of the user authentication 42b, the HDD automatic deletion 42c, and the network encryption strength 42d of the MFP10a in the conference room B to the security level 3, to the mediation apparatus 30. The mediation apparatus 30 transfers the setting change request to the MFP 10a in the conference room B. Upon receipt of the setting change request, the MFP 10a in the conference room B changes the setting parameters of the user authentication 42b, the HDD automatic deletion 42c, and the network encryption strength 42d in accordance with the requested security setting values.

Further, the notification section 73 of the remote center 70 transmits the setting change request, which requests for setting the security levels of the user authentication 42b and the network encryption strength 42d of the projector 10d in the conference room B to the security levels 2 and 3, respectively, to the mediation apparatus 30. The mediation apparatus 30 transfers the setting change request to the projector 10d in the conference room B. Upon receipt of the setting change request, the projector 10d in the conference room B changes the setting parameters of the user authentication 42b and the network encryption strength 42d in accordance with the requested security setting values.

Further, the notification section 73 of the remote center 70 transmits the setting change request, which requests for setting the security level of the user authentication 42b of the TV conference system 10e in the conference room B to the security level 1, to the mediation apparatus 30. The mediation apparatus 30 transfers the setting change request to the TV conference system 10e in the conference room B. Upon receipt of the setting change request, the TV conference system 10e in the conference room B changes the setting parameter of the user authentication 42b in accordance with the requested security setting value.

Further, in this case, a default policy No. for each of the conference rooms may be set in advance, so that the security levels of the MFP 10a, the projector 10d, and the TV conference system 10e can be set in accordance with the default policy NO. when determining that the conference is finished. First modified example of the first embodiment Next, a security management system 1 according to a first modified example of the first embodiment is described with reference to FIG. 11. FIG. 11 is a sequence diagram of a security management process according to the first modified example of the first embodiment.

In the first embodiment of FIG. 8, the manager knows the change of the setting of the apparatus only after the apparatus changes the security setting value. However, there may be a case where the manager would like to know that the setting of the apparatus is to be changed before the apparatus changes the security setting value.

The processes (flow) until the mediation apparatus 30 receives the setting change request (i.e., processes in steps S1 through S12) in the FIG. 11 is the same as those in FIG. 8. Therefore, the repeated description thereof is herein omitted.

The mediation apparatus 30, which receives the setting change request for the office apparatuses 10 for which it is necessary to change the security setting values based on the setting change request, inquires of the manager about whether to change the settings by sending an email to request the permission for changing the setting to the PC of the manager (manager PC) (step S21). An example of the message in the email is illustrated in FIG. 12.

FIG. 12 illustrates an example message in the email transmitted by the mediation apparatus 30 to the manager PC in the process in FIG. 11. In this case, the information indicates that the security level of the apparatus C is to be changed from level 2 to level 3. The message includes a permission button. When the manager presses the permission button, the manager PC transmits the notification indicating the permission to the mediation apparatus (step S22). Upon receipt of the notification, the mediation apparatus 30 notifies the apparatuses where the setting thereof is to be changed of the setting change request (step S23).

According to this first modified example, it becomes possible to collectively and automatically set (change) the security levels of the plural types of office apparatuses in accordance with the security policy corresponding to the data in the environment using the office apparatuses connected to a network after the manager permits (approves) the change of the security settings.

Second Embodiment

Figure 13:
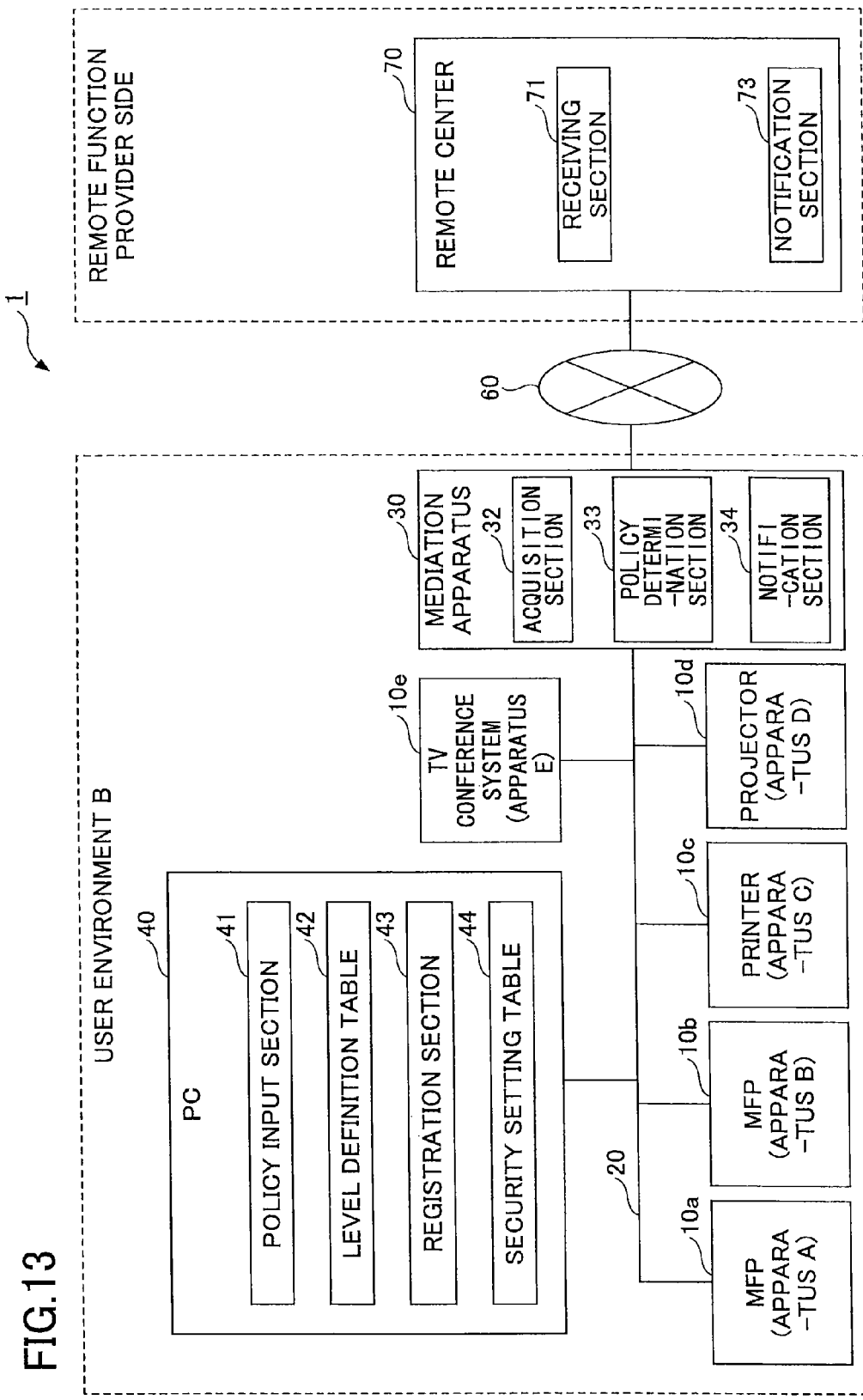
FIG. 13 illustrates an example configuration of a security management system according to a second embodiment.

Next, a security management system according to a second embodiment of the present invention is described with reference to FIG. 13. FIG. 13 illustrates an example overall configuration of the security management system according to the second embodiment. The configuration of the security management system 1 according to the second embodiment differs from that in the first embodiment in that the policy determination section is provided as a function of the mediation apparatus 30. In the first embodiment, the policy determination section is provided as a function of the remote center 70. Namely, in the user environment B according to this embodiment, the mediation apparatus 30 includes the policy determination section.

Specifically, the mediation apparatus 30 according to the second embodiment includes the acquisition section 32, the policy determination section 33, and the notification section 34. Further, the remote center 70 according to the second embodiment includes the receiving section 71 and the notification section 73.

In this embodiment, the acquisition section 32 of the mediation apparatus 30 disposed in the user environment B detects the state change indicating that it is desired to change the security setting, and the policy determination section 33 determines the security policy in the office apparatus. Namely, the policy determination section 33 identifies the apparatus whose security setting value is to be changed from the office apparatus 10 based on the information acquired by the acquisition section 32 and determines the security level of the identified client apparatus. The functions of the policy determination section 33 are the same as those of the policy determination section 72. The notification section 34 notifies the remote center 70 of the notification so that the remote center 70 sends the setting change request to the identified apparatus whose security setting values are to be changed.

The receiving section 71 of the remote center 70 receives the notification from the mediation apparatus 30. The notification section 73 notifies the identified apparatus whose security setting values are to be changed of the setting change request.

Security Management Process

Figure 14:
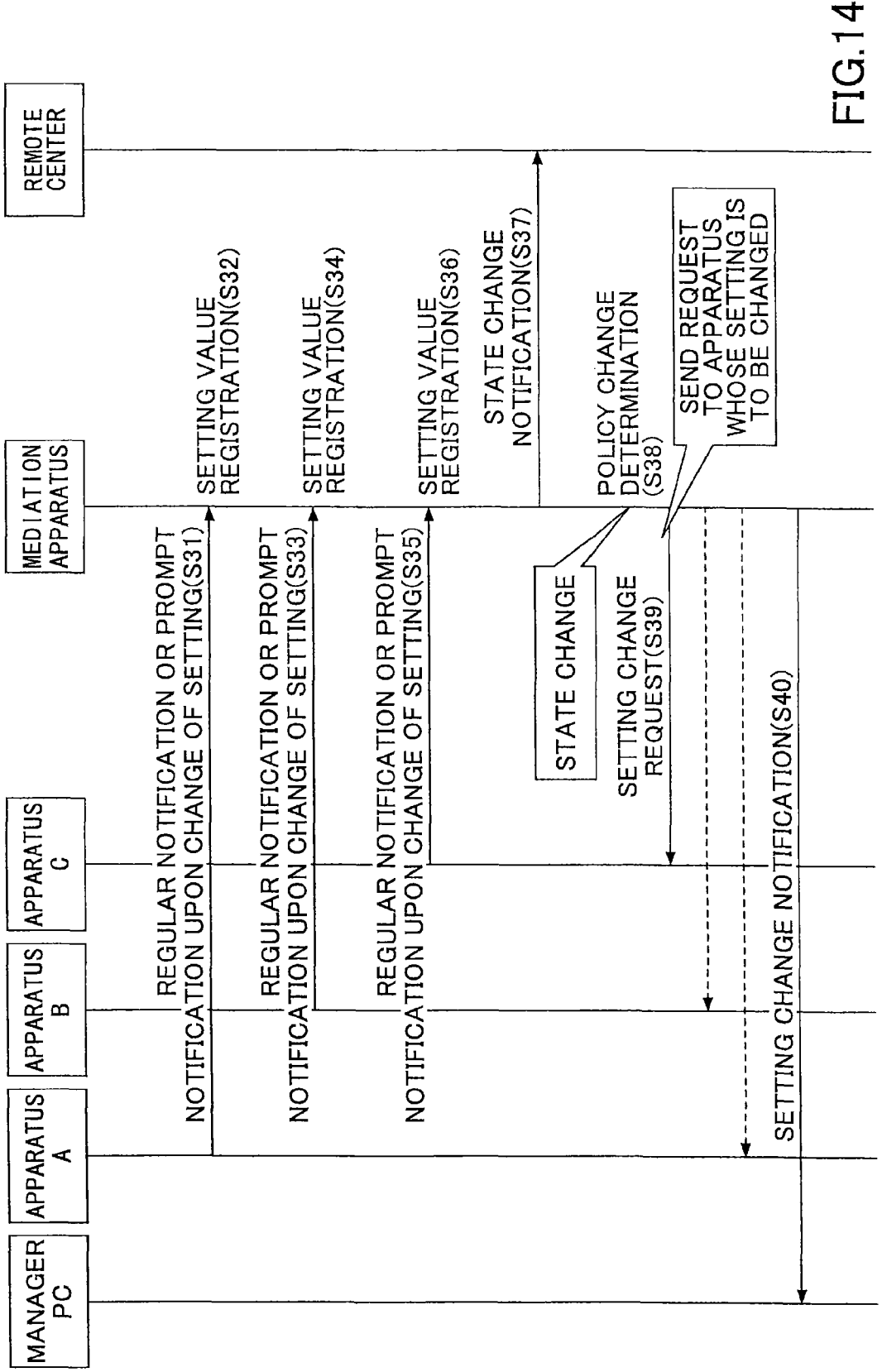
FIG. 14 is an example sequence diagram of an overall security management process according to the second embodiment.

Next, a process of the security management system 1 according to the second embodiment is described with reference to FIG. 14. FIG. 14 is an example sequence diagram of the security management process according to the second embodiment.

As illustrated in FIG. 14, the mediation apparatus 30 registers the states of the apparatuses A, B, and C (steps S32, 34, and S36) in response to the notifications from the apparatuses A, B, and C at a predetermined timing or the receipt of the notification indicating the setting change (step S31, S33, and S35). Further, when the state is changed, the notification section 34 of the mediation apparatus 30 notifies the remote center 70 of the state change (step S37).

In case of the state change, the policy determination section 33 determines whether it is possible to change the setting (step S38), and transmits the setting change request to the apparatus whose setting is to be changed (step S39). Finally, the policy determination section 33 notifies the manager PC of the setting change (step S40).

According to the security management system 1 in the second embodiment, in the environment where plural types of office apparatuses connected to a network are used, it is possible to collectively and automatically set the security settings in accordance with the security policy corresponding to the state. Further, in the security management system 1 according to the second embodiment, the mediation apparatus 30 includes the policy determination section 33. Therefore, it is not necessary to transmit the security setting value to the remote center 70 via the Internet 60. Therefore, it becomes possible to provide a solution for a system having higher security which is valuable for a user who does not like to transmit the security setting value outside the company.

Third Embodiment
System Overall Configuration

Figure 15:
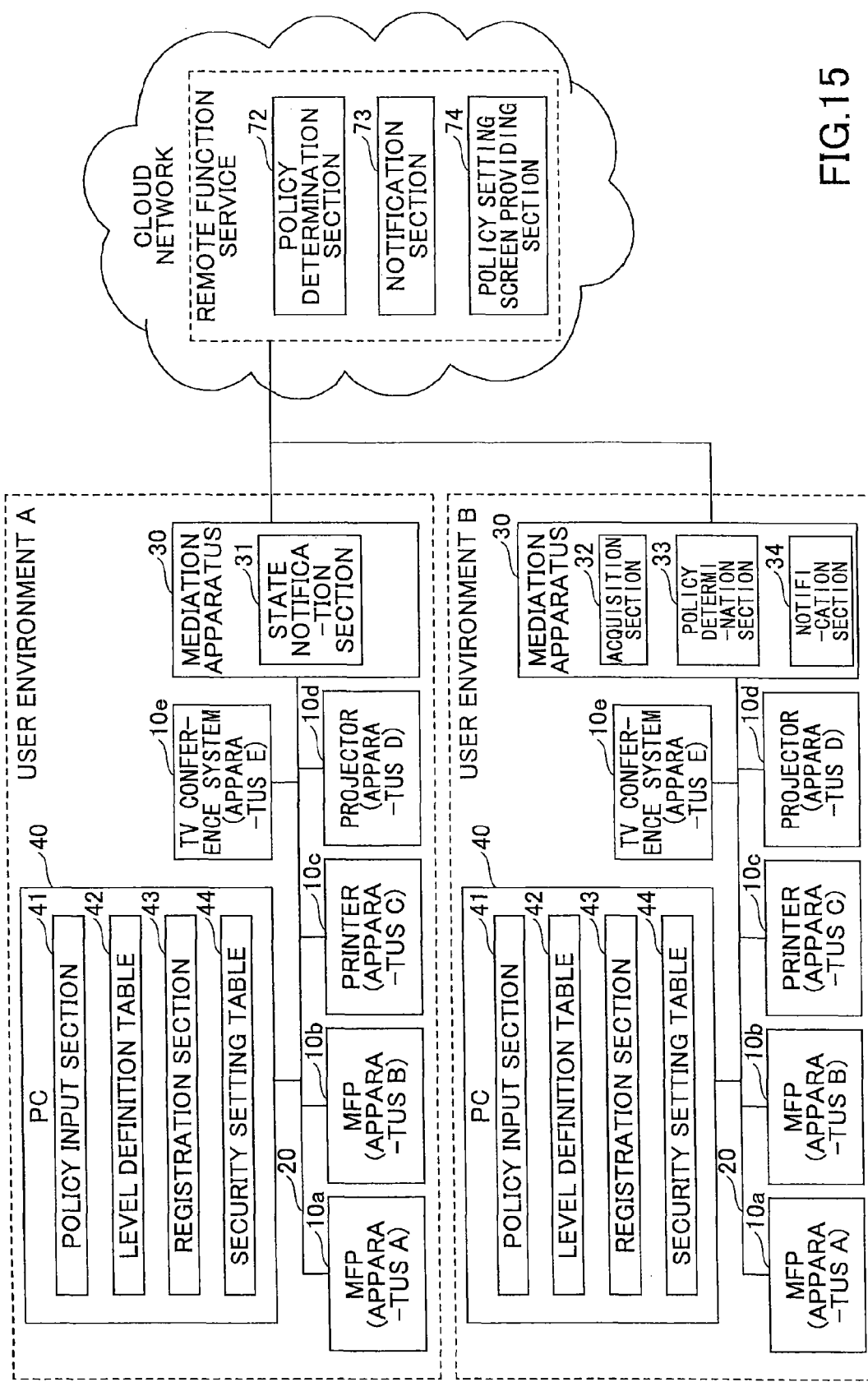
FIG. 15 illustrates an example configuration of a security management system according to a third embodiment.

Next, a security management system according to a third embodiment of the present invention is described with reference to FIG. 15. FIG. 15 illustrates an example overall configuration of the security management system according to the third embodiment. In the security management system 1 according to the first embodiment of FIG. 1, it is the remote center 70 that provides a remote function. On the other hand, in the security management system 1 according to the third embodiment, the remote function service is provided in the Cloud network. In addition, in this embodiment, the remote function service includes a function of a policy setting screen providing section 74.

As illustrated in "No. 3" of FIG. 6, when a user (manager) determines the policy, the user performs an input operation on the screen of the PC 40 installed in the user environment.

Security Management Process

Figure 16:
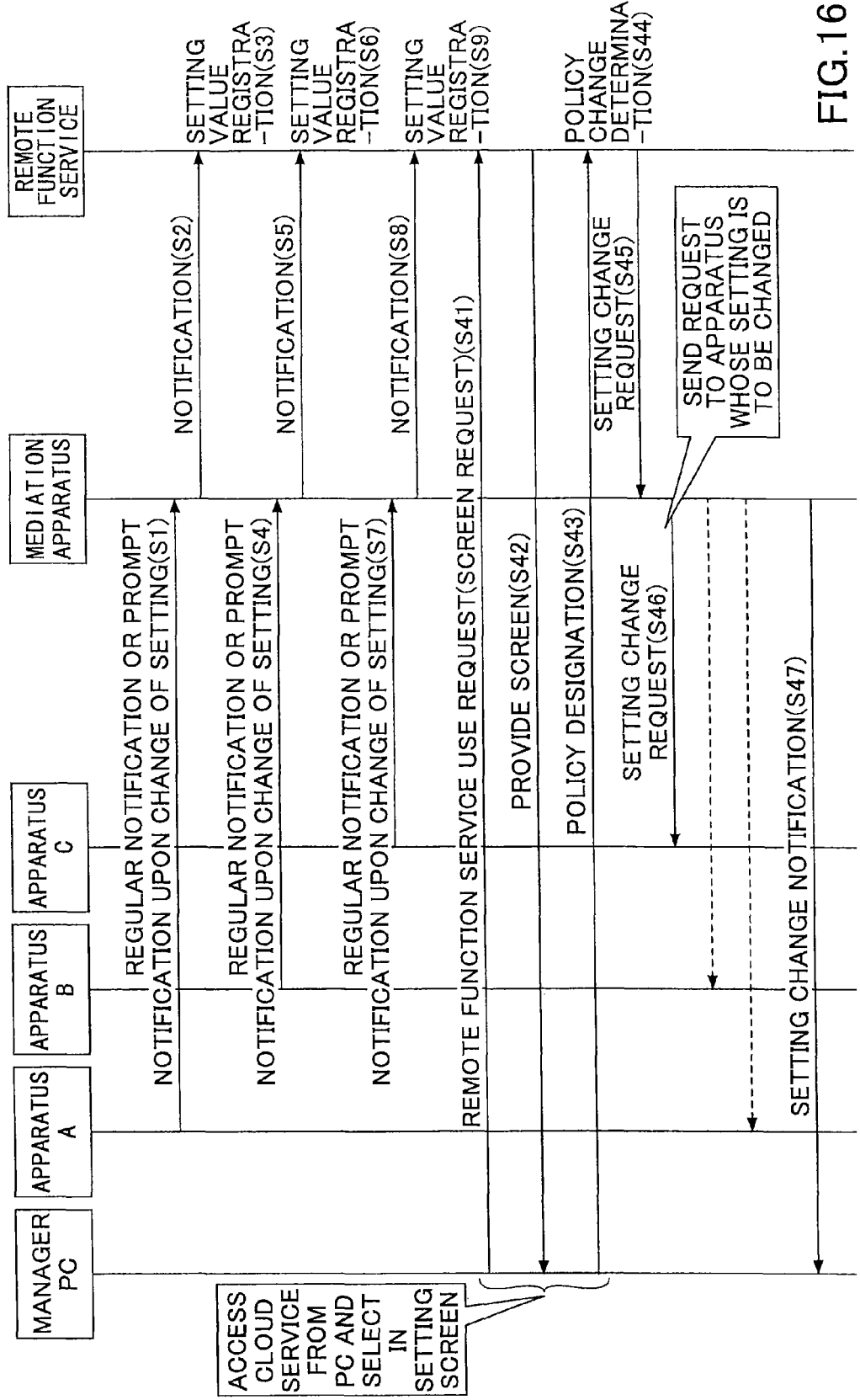
FIG. 16 is an example sequence diagram of an overall security management process according to the third embodiment.

FIG. 16 illustrates an operation of the security management system 1 according to the third embodiment. The processes until the security setting values from the apparatuses are registered (in steps S1 through S9) are the same as the processes (in steps S1 through S9) performed by the remote center 70 of FIG. 8.

After that, when the user (manager) is to change the security policy, the manager PC sends a request for remote function service in the Cloud network so that a selection screen is displayed on the PC 40 in order to use the policy determination service in the remote function service (step S41).

Figure 17:
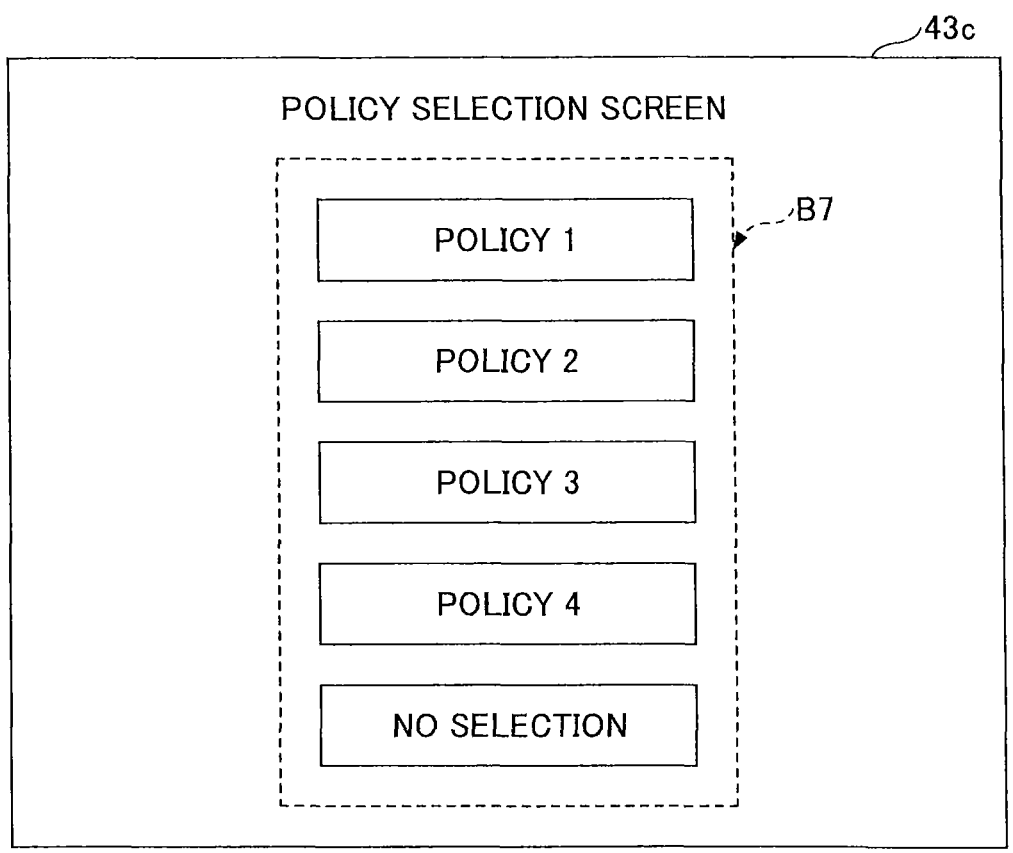
FIG. 17 illustrates an example screen according to first through third embodiments.

The policy setting screen providing section 74 of the remote function service displays, for example, the policy selection screen 43c as in FIG. 17 on the display of the PC 40 (step S42). The user can select a desired policy on the policy selection screen 43c, so as to send the selected policy to the remote function service (step S43). The policy determination section 72 of the remote function service receives the information indicating the selection, and can change the policy in the same process (flow) in FIG. 10.

In the security management system 1 according to the third embodiment, it becomes possible to collectively and automatically set the security level in accordance with the security policy by using the remote control service in the Cloud network under the environment where plural types of office apparatuses are used. Further, in the security management system 1 according to the third embodiment, it becomes possible to easily provide a policy selection screen (policy setting screen) to the manager. By using the screen, the manager can easily change the setting in accordance with the security policy that the manager intends to set. As a result, it becomes possible to use the apparatuses in the state in accordance with the manager's intention.

Next, a security management system 1 according a modified example in each of the above embodiments is described.

Response When Security Policy Setting Cannot be Changed

Several example responses are described below when the security policy setting, which is set based on the security policy authorized by the user, cannot be changed in any of the office apparatuses 10.

Power Off of Apparatus and Re-Setting Change Notification

In the security management process according to the first embodiment of FIG. 8, the mediation apparatus 30 sends a setting change request to an office apparatus 10 whose setting is to be changed (in FIG. 8, any office apparatus, from among apparatuses A, B, and C, whose setting is to be changed) (step S13).

Figure 20:
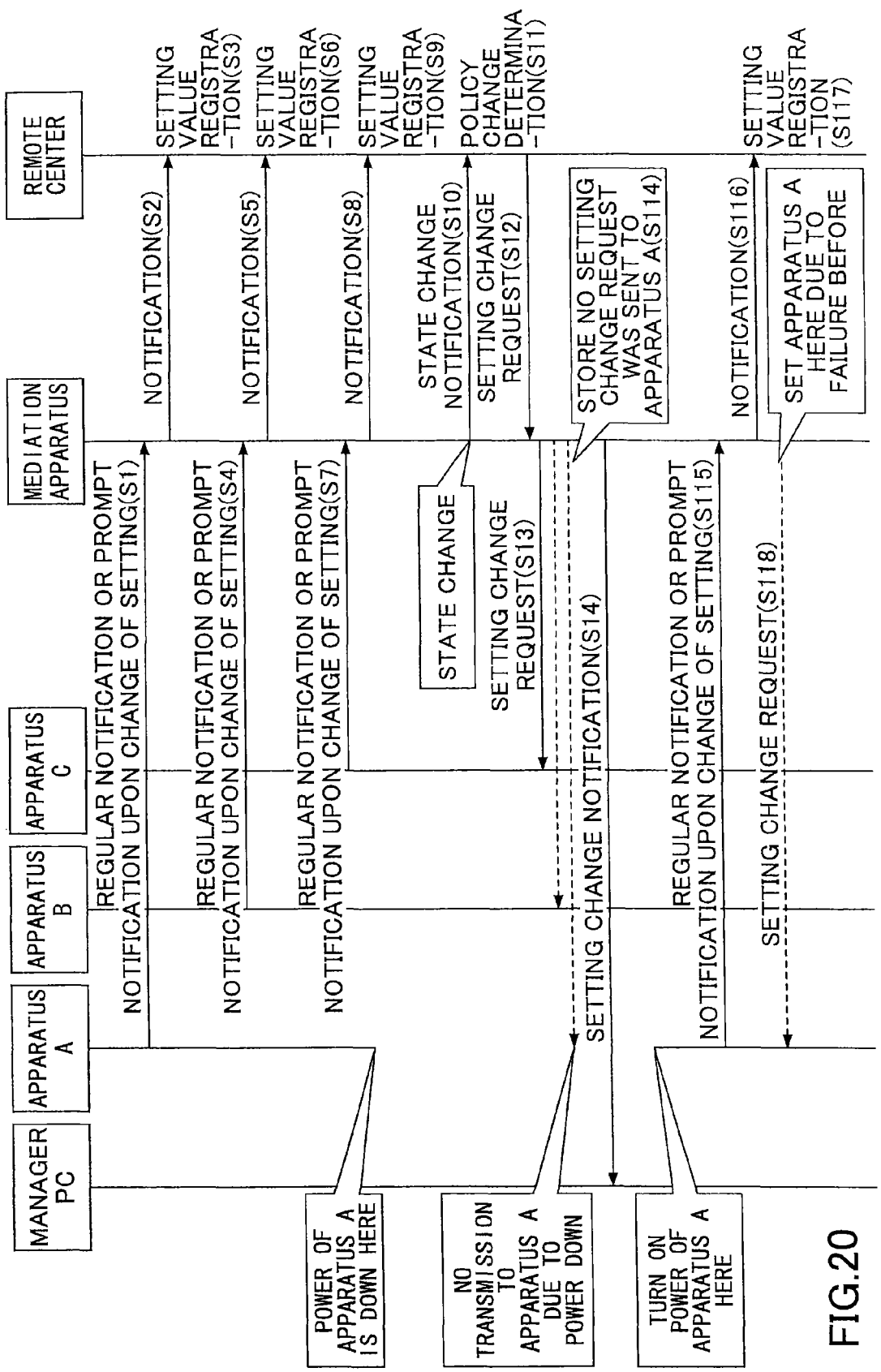
FIG. 20 is an example sequence diagram of an overall security management process according to a modified example of the second embodiment.

On the other hand, in the security management process in FIG. 20, when the setting change request is sent to the office apparatuses 10, the information indicating whether the security levels are changed is transmitted to the user (manager) of the office apparatuses 10 (any of the apparatuses A, B, and C whose setting is to be changed).

Details of this scheme are described with reference to FIG. 20. FIG. 20 is a sequence diagram of the security management process according to this modified example in the first embodiment of FIG. 8. The processes in steps S1 through S14 are the same as those in the same steps in FIG. 8, and therefore, the repeated descriptions thereof are herein omitted.

In this modified example, before the setting change request in step S13 is transmitted, the power of the apparatus A is turned off. In this case, the apparatus A cannot receive the setting change request. Therefore, the apparatus A cannot change the security policy setting thereof. Here, the mediation apparatus 30 temporarily stores the information indicating that the apparatus A could not change the setting and the security policy to be set into a memory area of the mediation apparatus 30 (step S114).

After that, when the power of the apparatus A is turned ON, a notification at a predetermined timing is transmitted from the apparatus A to the remote center 70 via the mediation apparatus 30 (steps S115 and S116). The remote center 70 registers the security setting value of the apparatus A (step S117). Further, the remote center 70 notifies the apparatus A of the information of the security policy to be set which is stored in the memory area (step S118: setting change notification).

The process when the security policy cannot be applied to an office apparatus 10 due to power off of the office apparatus 10 can be performed by the mediation apparatus 30 as described above or may be performed by the remote center 70. For example, in a case where the setting change is performed by the remote center 70, the information indicating the security policy to be applied is temporarily stored in the memory area of the remote center 70. When the power of the apparatus A is turned on, the notification at a predetermined timing is transmitted from the apparatus A to the remote center 70 via the mediation apparatus 30. Then, the remote center 70 transmits the information indicating the security policy to be applied stored in the memory area to the apparatus A via the mediation apparatus 30.

Change of Setting is Notified to User

Further, when the setting change request of the security level is transmitted to the apparatus(es), the information indicating the change of the security level may be sent to the user. By doing this, the user recognizes the change state of the security level. As a means for notifying the user of the change of the security level, the information indicating the change of the security level may be displayed on the screen (operation panel) of the office apparatus(es).

Specifically, a message "security is enhanced", "security level is set to level 3" or the like may be displayed on the screen of the relevant office apparatus. When the security level of any of the security items is reinforced (increased), a message "security level is increased" may be displayed. On the other hand, when the security level of any of the security items is lowered, a message "security level is lowered" may be displayed.

When the security level of any of the security items is reinforced (increased), the security item and the set level may be displayed. For example, a message "user authentication level is increased from level 1 to level 2" may be displayed.

When the security levels of two or more security items are reinforced (increased), the security items and the corresponding set levels may be displayed. For example, a message "user authentication level is increased from level 1 to level 2, and encryption strength is increased from level 1 to level 3" may be displayed.

As another example means of notifying the user of the security level change, there may be a method of vibrating the office apparatus "A", outputting a particular sound from the apparatus "A", outputting particular light from the apparatus "A" or the like.

User Authentication

When the IC card such as an employee ID card has a failure, there may a case where some office apparatus cannot change the security level setting related to the user authentication based on the current security policy. In this case, the security management system 1 in this embodiment may perform the user authentication by allowing the user to input the password. Further, the security management system 1 in this embodiment may prohibit the IC card having a failure from being used for the user authentication.

Figure 21:
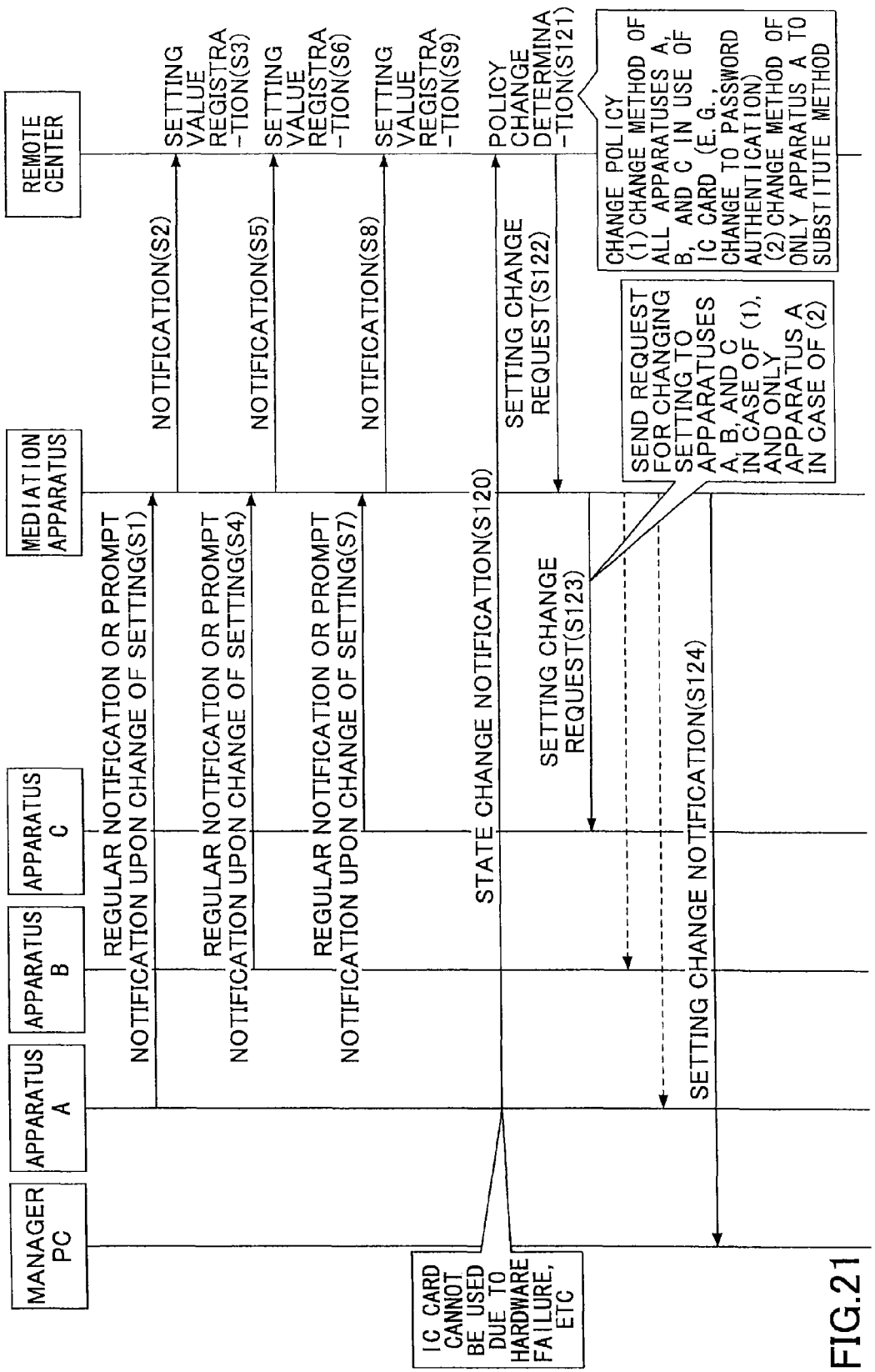
FIG. 21 is an example sequence diagram of the management of a remote center when a security policy cannot be applied.
Figure 22:
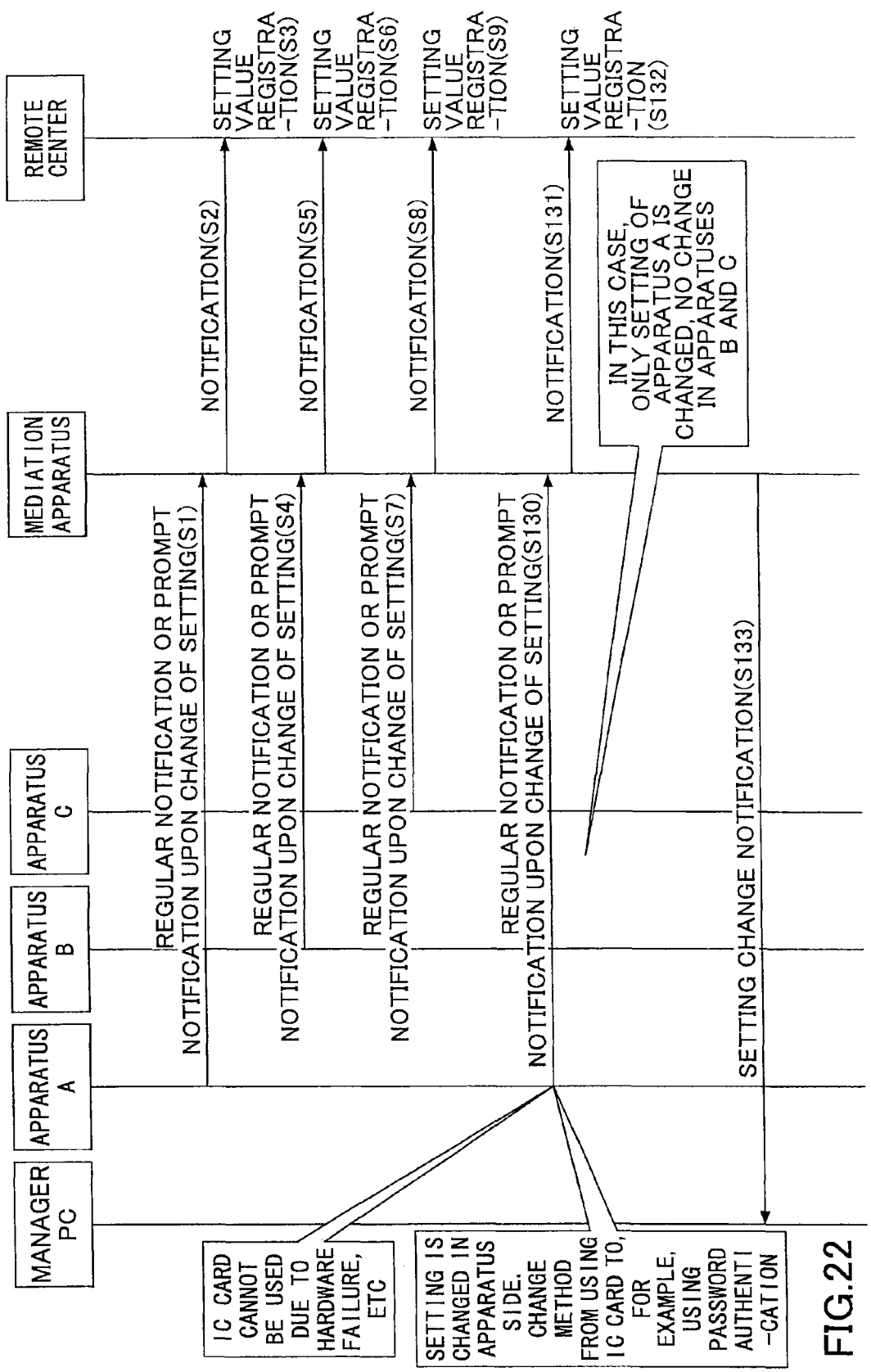
FIG. 22 is an example sequence diagram of the management of the mediation apparatus when the security policy cannot be applied.

Details are described with reference to FIGS. 21 and 22. FIGS. 21 and 22 illustrate an example security management process when an IC card (IC card authentication) cannot be used due to apparatus failure. FIG. 21 illustrates a case where the process is collectively performed on the remote center 70 side. FIG. 22 illustrates a case where the process is performed on the apparatus side.

The processes of steps S1 through S9 in FIGS. 21 and 22 are respectively the same. Therefore, the repeated descriptions thereof are herein omitted.

In a case where an IC card cannot be used in the apparatus A due to a hardware failure, according to the security management process of FIG. 21, the apparatus A reports the state change (in step S120). In response to the report, the remote center 70 changes the security policy setting (step S121). For example, the remote center 70 may change the security policy so that a method (e.g., password authentication) in place of the IC card method is applied to all of the apparatuses A through C. Otherwise, for example, the remote center 70 may change the security policy so that a method (e.g., password authentication) in place of the IC card method is applied only to apparatus A where an IC card cannot be used.

The remote center 70 transmits the setting change request (step S122). The mediation apparatus 30 transmits the setting change request to the apparatus(es) whose security policy is to be changed (step S123). For example, in the case where the security policy is changed so that a method (e.g., password authentication) in place of the IC card method is applied to all of the apparatuses A through C, the mediation apparatus 30 transmits the setting change request to the apparatuses A through C. Further, in the case where the security policy is changed so that a method (e.g., password authentication) in place of the IC card method is applied only to apparatus A, the mediation apparatus 30 transmits the setting change request to the apparatus A. Further, the mediation apparatus 30 notifies the manager PC of the setting change (step S124).

On the other hand, in the case where an IC card cannot be used in the apparatus A due to a hardware failure, according to the security management process of FIG. 22, the apparatus A changes the security policy setting. To that end, for example, the security policy setting may be be changed after password authentication. In this case, only the security policy setting of the apparatus A is changed and the security policy settings of the apparatuses B and C are not changed.

The apparatus A reports the information indicating that the security level setting thereof is changed (step S130). The mediation apparatus 30 transfer the information to the remote center 70 (step S131). The remote center 70 registers the setting value of the security policy (step S132). Further, the mediation apparatus 30 reports the setting change to the manager PC (step S133). Encryption strength, HDD automatic deletion, etc.

Next, a response is described when any of the office apparatuses 10 cannot change the security level setting based on the security policy such as the encryption strength, the HDD automatic deletion, etc. When any of the office apparatuses 10 cannot change the security level setting such as, for example the encryption strength or the HDD automatic deletion, in the security management system 1 according to this embodiment, it is preferable that the security level be set to a high level. Setting the security level to a high level refers to, for example, setting the security level to the highest level or setting the security level to a level higher than the previous level.

Response when there are Two or More Setting Conditions of the Security Policy

Next, a setting change of the security policy when there are two or more setting conditions of the security policy is described with reference to FIG. 23. FIG. 23 is a flowchart of a security management process according to an modified example when there are more than one setting conditions of the security policy.

For example, when the policy determination section 72 determines that there are two or more setting conditions of the security policy (YES in step S200), the policy determination section 72 determines whether the user selects the setting condition of the security policy (step S202). When determining that the user selects the setting condition of the security policy (YES in step S202), the policy determination section 72 changes the security policy based on the selection by the user (step S204), and terminates the this process.

For example, in the security policy No. 4 of FIG. 6, when two security policies Nos. 2 and 3 are provided as the setting conditions of the security policy and the user selects one of the security policies, the security policy is changed into (set to) the security policy which is selected by the user. Further, in the security policy No. 5 of FIG. 6, when two security policies Nos. 1 and 3 are provided as the setting conditions of the security policy and the user selects one of the security policies, the security policy is changed into (set to) the security policy which is selected by the user.

In step S202, when the user does not select one of the setting conditions of the security policy (NO in step S202), the policy determination section 72 determines whether the automatic change of the security policy is set (step S206).

When determining that the automatic change of the security policy is set (YES in step S206), the policy determination section 72 sets the security policy which is to be selected based on the automatic change (step S208), and terminates the process.

When in the case of security policy No. 4 of FIG. 6, when the user does not select the policy, the security policy No. 2 is automatically selected. Further, when in the case of security policy No. 5 of FIG. 6, when the user does not select the policy, the security policy No. 1 is automatically selected.

In step S206, when determining that the automatic change is not set (NO in step S206), the policy determination section 72 selects and sets the security policy having a higher security level among two or more setting conditions of the security policies (step S210), and terminates the process.

For example, in the example state of FIG. 6, when an "employee" and a "guest who comes from outside the firm" are in the same conference room, the security policy having a higher security level is selected and set. For example, in FIG. 6, in the case where the security policy No. 1 denotes the security level when the guest can enter the conference room and the security policy No. 2 denotes the security level when only the employees can enter the conference room, if both the guest and the employee are in the same conference room, the security policy No. 1, which has a higher security level than that of the security policy No. 2, is set as the security policy of the conference room. By doing this, it becomes possible to prevent the guest from accessing the information that is set to be accessed only by the employees.

However, it should be noted that the above responses when there are plural setting conditions of the security policy are examples only, and the present invention is not limited to the responses. Namely, in an above example, the security policy is determined based on the user's selection regardless of the priority levels of the security policies. However, the present invention is not limited to this selection. For example, when there are two or more security polies to be selected, the security policy having a higher security level may be selected regardless of the user's selection.

Example Level Definition Table

Next, examples of the level definition table 42 other than the example of FIGS. 2A through 2C are described with reference to FIGS. 24A through 24C. FIGS. 24A through 24C illustrate other examples of the level definition table 42.

As the security items of the level definition table 42 in FIG. 24A, besides the user authentication 42b, the HDD automatic deletion 42c, and the network encryption strength 42d, the following security items are provided.

Access Log 42e/Job Log 42f

The access log 42e refers to a record of access history from a network to the apparatuses such as the office apparatuses 10. In the level definition table 42, the record of the access log 42e can be enabled or disabled.

The job log 42f refers to a record of jobs (operations) such as printing and scanning by the apparatus. In the level definition table 42, the record of the a job log 42f can be set to enabled or disabled.

Auto Logout 42g

The auto logout 42g is a function to automatically log out the apparatus when the apparatus is not used for a predetermined time period. In the level definition table 42, the auto logout 42g can be set to enabled or disabled.

Media Slot 42h

The media slot 42h is a slot where a recording medium such as a USB memory is mounted. In the level definition table 42, reading and writing data from and into the recording medium such as a USB memory mounted in the media slot 42h can be set to enabled or disabled.

Network Protocol 42i

In the level definition table 42, the access authority to access the apparatus from the network is defined based on the network protocol 42i such as "ftp", "http", "SNMP" and the like. For example, it is possible to set the security level of the network protocol 42i so as to permit all the protocols and set the security level of the network protocol 42i so as to permit only some of the protocols. Further, it is also possible to set the network protocol 42i by separately setting whether use of each of "ftp", "http", "SNMP" and the like is enabled or disabled.

Password

In the level definition table 42, the lockout upon the input of incorrect passwords, the number of digits in passwords, the number of characters and the like are defined. For example, then the lockout is enabled, if the input of the password has failed three times, the use of the apparatus is prohibited. Further, the password is defined in a manner such that the number of digits of the password may be limited within a range from four to eight digits. Further, as the password, it is defined which of only figures, a combination of figures and alphabetical characters, or a combination of figures, alphabetical characters, and the Kanji characters is allowed.

Fourth Embodiment

Figure 25A:
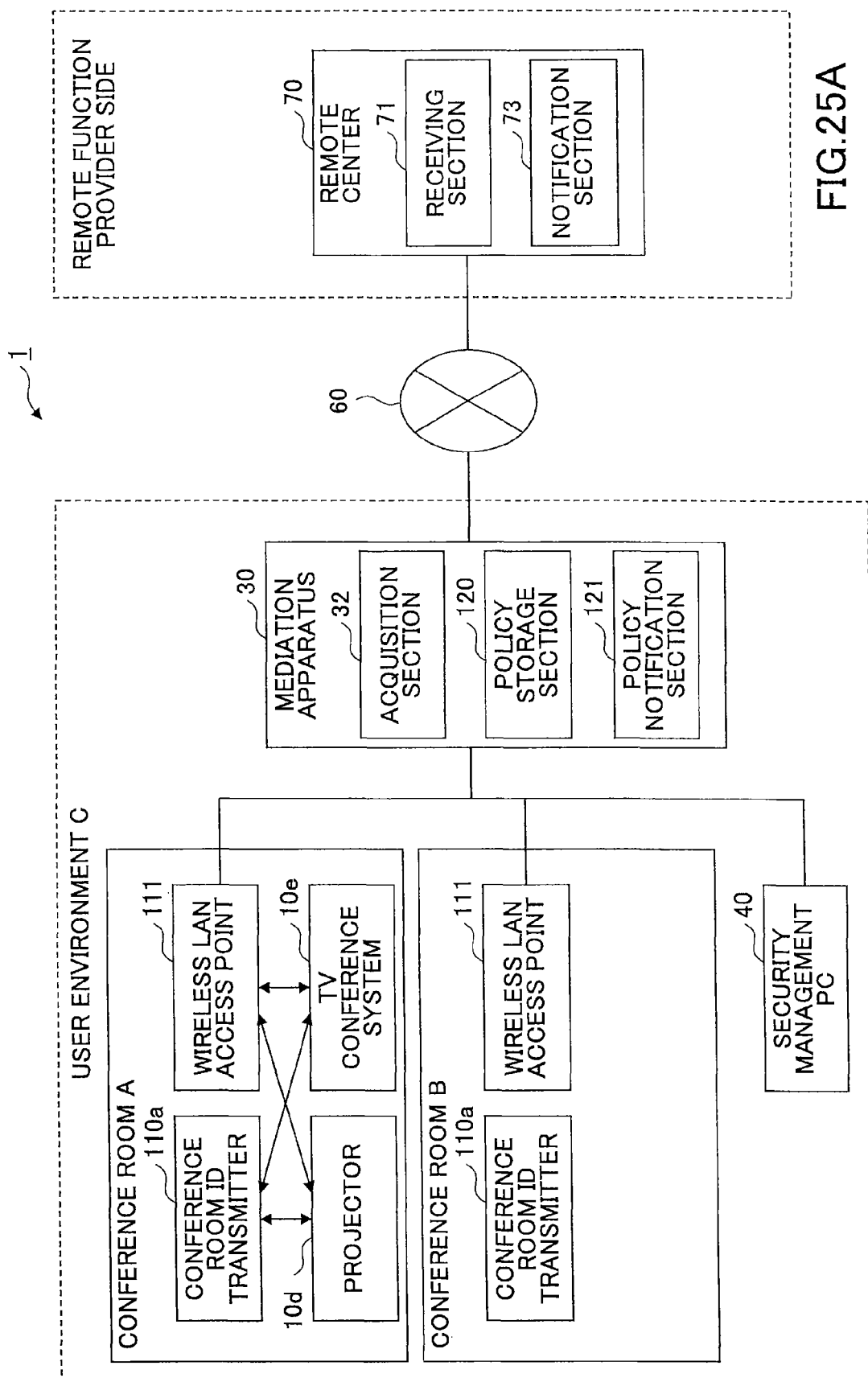
FIGS. 25A and 25B illustrate example configurations of a security management system according to a fourth embodiment.
Figure 25B:
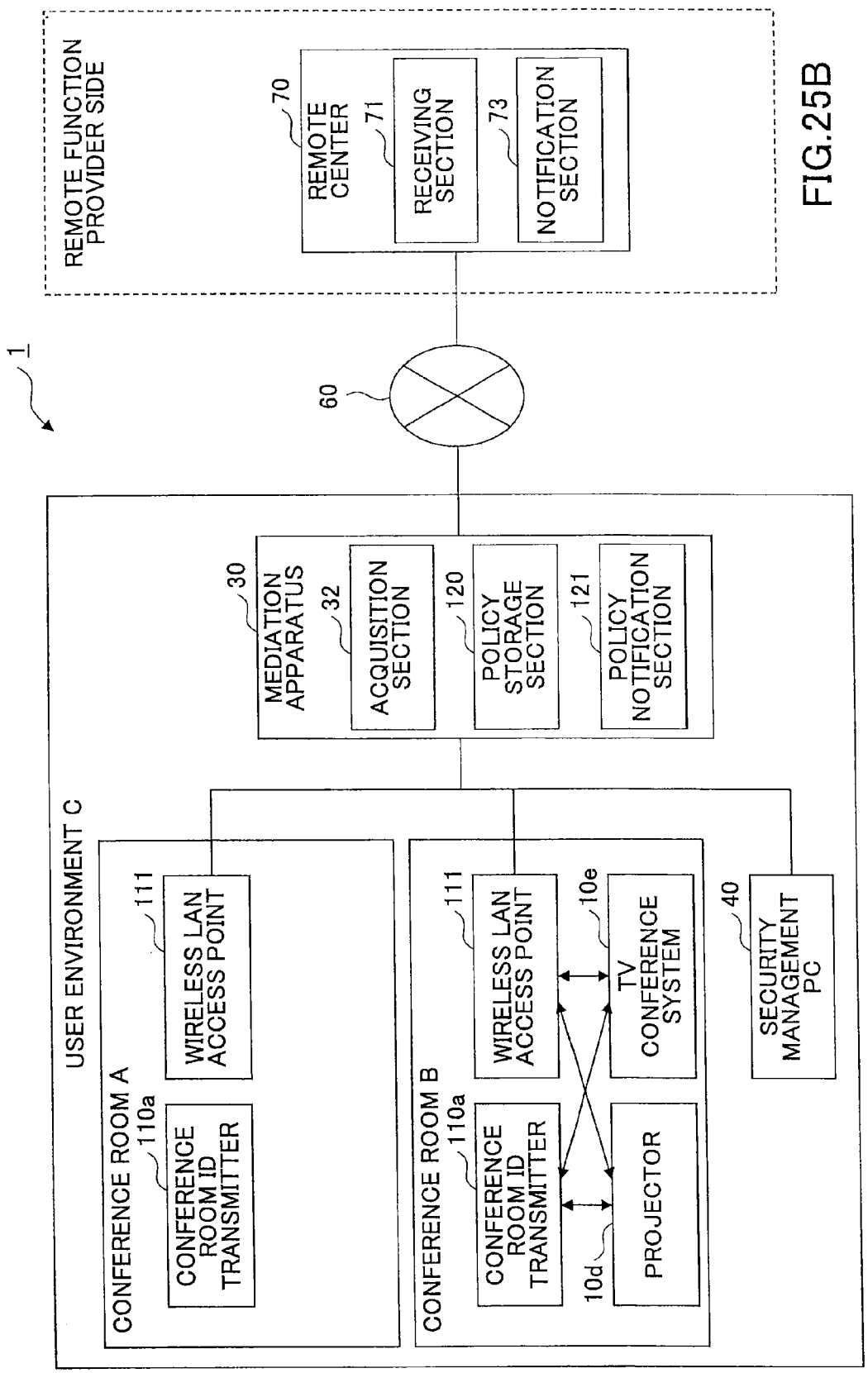
Figure 26:
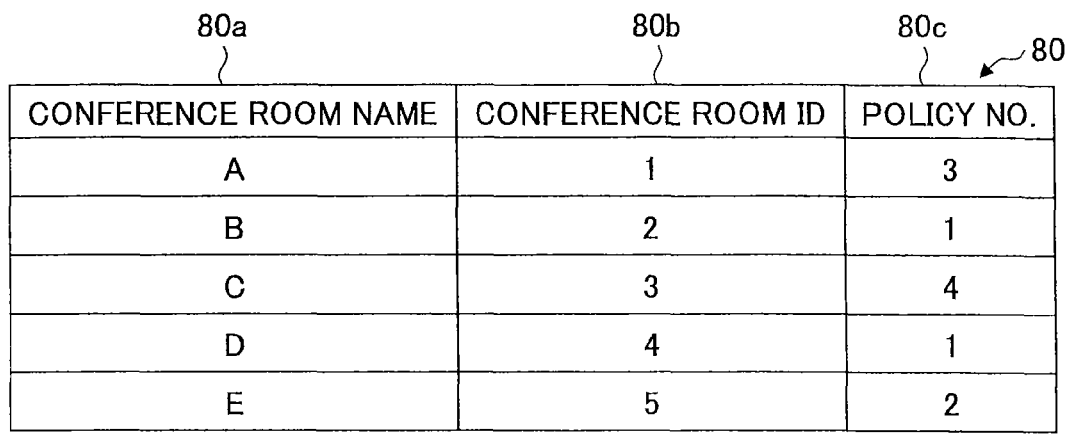
FIG. 26 illustrates an example conference room corresponding table according to the fourth embodiment.

Next, a security management system according to a fourth embodiment of the present invention is described with reference to FIGS. 25A through 27. FIGS. 25A and 25B are example configurations of the security management system 1 according to the fourth embodiment. FIG. 26 illustrates an example level definition table according to the fourth embodiment. FIG. 27 is a flowchart of an example security management process according to the fourth embodiment.

In the fourth embodiment, security management is described when the security policy management is divided and executed. FIGS. 25A and 25B illustrates respective configurations of the security management system 1 according to this embodiment. FIG. 25A illustrates a case where the projector 10d and the TV conference system 10e are disposed in the conference room A, and FIG. 25B illustrates a case where the projector 10d and the TV conference system 10e are disposed in the conference room B. All other configurations in FIGS. 25A and 25B are respectively the same.

A conference room ID transmitter 110a includes a Bluetooth module and is installed on the ceiling of the conference rooms A and B. A wireless LAN access point 111 provides a connection between the wireless communication based on IEEE802.11b/a/g/n and a wired LAN Ethernet (registered trademark). The mediation apparatus 30 includes the acquisition section 32, a policy storage section 120 storing the security policy (security levels) in association with the conference room ID, and a policy notification section 121 which transmits the data stored in the policy storage section 120 to the projector 10d and the TV conference system 10e. A security manager decides the security policies of the conference rooms. A conference room corresponding table 80, in which the conference room ID is associated with the policy No., is stored in the policy storage section 120 of the mediation apparatus 30. FIG. 26 illustrates an example conference room corresponding table 80.

In the conference room corresponding table 80, the conference room ID 80b is associated with the policy No. 80c. The conference room corresponding table 80 may further store a conference room name 80a.

Further, the policy notification section 121 transmits the conference room ID 80b and the corresponding security levels of the user authentication 42b and the encryption strength 42d to the projector 10d. The policy notification section 121 further transmits the conference room ID 80b and the corresponding security level of the user authentication 42b to the TV conference system 10e The projector 10d and the TV conference system 10e include the respective policy storage sections (not shown), so that the projector 10d stores the transmitted conference room ID 80b and the corresponding security levels of the user authentication 42b and the encryption strength 42d in the non-volatile memory (flash memory) thereof and the TV conference system 10e stores the transmitted conference room ID 80b and the corresponding security level of the user authentication 42b in the non-volatile memory (flash ROM) thereof. The projector 10d and the TV conference system 10e further include the respective Bluetooth modules so as to acquire the conference room ID from the conference room ID transmitter 110a via Bluetooth communication. The projector 10d and the TV conference system 10e further include the respective wireless LAN modules so as to be in wireless communication with the wireless LAN access point 111 in accordance with IEEE802.11b/a/g/n standards.

In the following, an operation of the projector 10d and an operation of the TV conference system 10e are described with reference to the flowchart of FIG. 27. First, when the power of the projector 10d is turned on, the process of FIG. 27 is started. The projector 10d is in connection with the mediation apparatus 30 via the wireless LAN and sends a request message to the mediation apparatus 30 so as to acquire the data of the conference room and the corresponding policy stored in the conference room corresponding table 80 (step S300). This request message includes the apparatus ID of the projector 10d.

Upon receipt of the request message, the mediation apparatus 30 stores the reception time data in association with the apparatus ID of the projector 10d into the non-volatile memory (flash ROM). Then, the mediation apparatus 30 determines whether the conference room corresponding table 80 is updated since the receipt of the previous request message. When determining that the conference room corresponding table 80 is not updated, the mediation apparatus 30 transmits the response including the information indicating that there is no updated data. On the other hand, when determining that the conference room corresponding table 80 is updated or when the mediation apparatus 30 does not receive the request message from the projector 10d in the past, the mediation apparatus 30 transmits the conference room ID and the corresponding security levels of the user authentication 42b and the encryption strength 42d to the projector 10d. In this case, when two or more conference IDs are stored in the mediation apparatus 30, the mediation apparatus 30 transmits the conference room ID and the corresponding security levels of the user authentication 42b and the encryption strength 42d for each of the two or more conference IDs. The projector 10d determines whether there are updated data (step S302). When the projector 10d receives the security levels of the user authentication 42b and the encryption strength 42d, the projector 10d determines that there are updated data, so that the projector 10d stores those received data into the policy storage section 120 (step S304).

Similarly, when the power of the TV conference system 10e is turned on, the process of FIG. 27 is started. The TV conference system 10e is in connection with the mediation apparatus 30 via the wireless LAN and sends a request message to the mediation apparatus 30 so as to acquire the data of the conference room and the corresponding policy stored in the conference room corresponding table 80 (step S300). This request message includes the apparatus ID of the TV conference system 10e.

Upon receipt of the request message, the mediation apparatus 30 stores the reception time data in association with the apparatus ID of the TV conference system 10e into the non-volatile memory (flash ROM). Then, the mediation apparatus 30 determines whether the conference room corresponding table 80 is updated since the receipt of the previous request message. When determining that the conference room corresponding table 80 is not updated, the mediation apparatus 30 transmits the response including the information indicating that there is no updated data. On the other hand, when determining that the conference room corresponding table 80 is updated or when the mediation apparatus 30 did not receive the request message from the TV conference system 10e in the past, the mediation apparatus 30 transmits the conference room ID and the corresponding security level of the user authentication 42b to the TV conference system 10e. In this case, when two or more conference IDs are stored in the mediation apparatus 30, the mediation apparatus 30 transmits the conference room ID and the corresponding security level of the user authentication 42b for each of the two or more conference IDs. When the TV conference system 10e receives the security level of the user authentication 42b, the TV conference system 10e stores those received data into the policy storage section 120 (steps S302 and S304). The mediation apparatus 30, the projector 10d, and the TV conference system 10e store the security level which is based on the conference room corresponding table 80 of FIG. 27. The policy No. of FIG. 26 corresponds to the policy No. in the level definition table 42 of FIG. 3.

When a user who will participate in a conference brings the projector 10d and the TV conference system 10e into the conference room A, the projector 10d and the TV conference system 10e execute Bluetooth communication with the conference room ID transmitter 110a and acquire the conference room ID (="1"). In this case, the conference room ID transmitter 110a operates as a Bluetooth master terminal and the projector 10d and the TV conference system 10e operate as Bluetooth slave terminals.

Upon receipt of the conference room ID (="1") from the conference room ID transmitter 110a (step S306), the projector 10d refers to the conference room corresponding table 80 (FIG. 26) stored in the flash ROM thereof and acknowledges that the policy No. of the conference room A is "3" (step S308). Then, the projector 10d refers to the (security) level definition table 42 of FIG. 3, and determines (detects) that both the security levels of the user authentication 42b and the encryption strength 42d is "level 1". Then, the projector 10d sets the security thereof based on the security levels (step S310).

Upon receipt of the conference room ID (="1") from the conference room ID transmitter 110a (step S306), the TV conference system 10e refers to the conference room corresponding table 80 (FIG. 26) stored in the flash ROM thereof and acknowledges that the policy No. of the conference room A is "3" (step S308). Then, the TV conference system 10e refers to the (security) level definition table 42 of FIG. 3, and determines (detects) that the security level of the user authentication 42b is "level 1". Then, the TV conference system 10e sets the security thereof based on the security level (step S310).

Next, when a user brings those projector 10d and the TV conference system 10e into the conference room B, the projector 10d and the TV conference system 10e execute the Bluetooth communication with the conference room ID transmitter 110a and acquire the conference room ID (="2") (step S306). In this case, the conference room ID transmitter 110a operates as the Bluetooth master terminal and the projector 10d and the TV conference system 10e operate as the Bluetooth slave terminals.

Upon receipt of the conference room ID (="2"), the projector 10d refers to the conference room corresponding table 80 (FIG. 26) stored in the flash ROM thereof and acknowledges that the policy No. of the conference room B is "1" (step S308). Then, the projector 10d refers to the (security) level definition table 42 of FIG. 3, and determines (detects) that the security level of the user authentication 42b is "level 2" and the security level of the encryption strength 42d is "level 3". Then, the projector 10d sets the security thereof based on the security levels (step S310).

Upon receipt of the conference room ID (="2") (step S306), the TV conference system 10e refers to the conference room corresponding table 80 (FIG. 26) stored in the flash ROM thereof and acknowledges that the policy No. of the conference room B is "1" (step S308). Then, the TV conference system 10e refers to the (security) level definition table 42 of FIG. 3, and determines (detects) that the security level of the user authentication 42b is "level 1". Then, the TV conference system 10e sets the security thereof based on the security level (step S310).

Further, according to the embodiment, the conference room corresponding table 80 stores the corresponding data including the conference room ID in association with the policy No. However, for example, when one floor is divided into several areas, the conference room corresponding table 80 may store the corresponding data including the area ID, in place of the conference room ID, in association with the policy No. In this case, in response to the change of the area, the security setting according to this embodiment is done. The conference room corresponding table 80 is an example of a definition table which is defined so that the security setting value of each type of the apparatuses is associated with the place (positions) of the apparatuses. Here, the place includes a (spatially) divided area like a conference room and an area which is not (spatially) divided (by walls or the like).

Example Hardware Configuration

Figure 18:
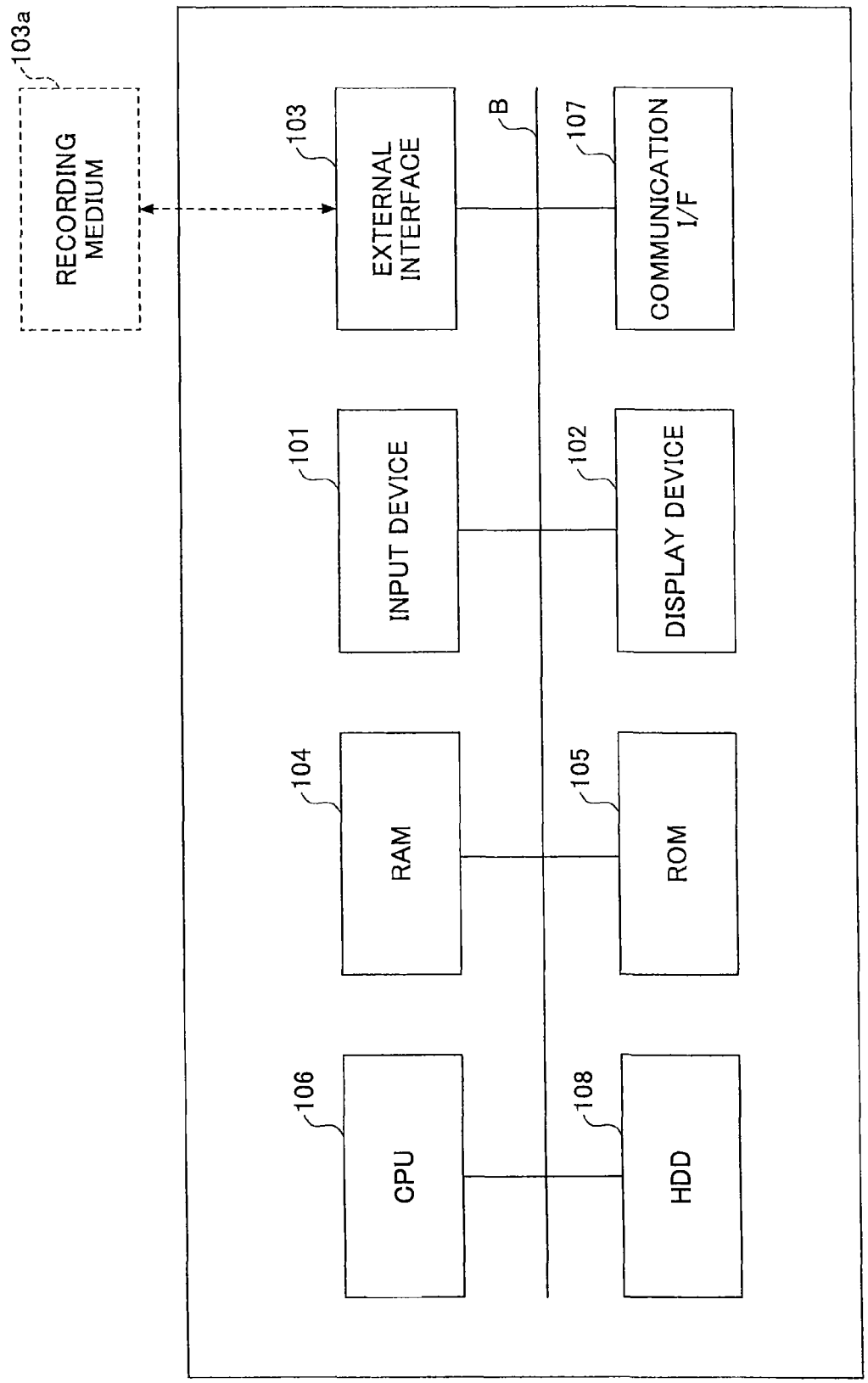
FIG. 18 illustrates an example hardware configuration of a mediation apparatus according to first through fourth embodiment.

Finally, an example hardware configuration of the mediation apparatus 30 according to this embodiment is described. FIG. 18 illustrates an example hardware configuration according to first through fourth embodiments. Here, the basic elements in the hardware configurations of the office apparatus 10, the PC 40, the remote center 70 are the same as those in the hardware configuration of the mediation apparatus 30. Therefore, the descriptions thereof are herein omitted.

The mediation apparatus 30 includes, for example, an input device 101, a display device 102, and an external I/F 103, a Random Access Memory (RAM) 104, a Read Only Memory (ROM), a Central Processing Unit (CPU) 106, a communication I/F 107, and a Hard Disk Drive (HDD) 108, which are mutually connected via bus B.

The input device 101 includes, for example, a keyboard and a mouse and is used for inputting various operation signals to the mediation apparatus 30. The display device 102 includes a display to display various screens.

The communication I/F 107 is an interface to connect the mediation apparatus 30 to the company network 20 and the Internet 60. Via the communication I/F 107, the mediation apparatus 30 can communicate with another apparatus (e.g., the office apparatus 10 and the remote center 70).

The HDD 108 is a non-volatile storage device to store a program and data. The stored program and data include an Operating System (OS) which is fundamental software to control the entire apparatus, and application software programs which provide various functions running on the OS. Further, in the HDD 108, the stored programs and data are managed by a file system and/or database (DB).

The external I/F 103 is an interface to an external device. Such a device includes a recording medium 103a. Via the external I/F 103, the mediation apparatus 30 can read and write data from and to the recording medium 103a. The recording medium 103a includes, for example, a floppy (trademark or registered trademark) disk, a Compact Disk (CD), a Digital Versatile Disk (DVD), an SD Memory Card, and a Universal Serial Bus (USB) memory.

The ROM 105 is a non-volatile semiconductor storage device storing internal data even when the power thereof is cut off. The ROM 105 stores, for example, a Basic Input/Output System (BIOS) which is executed when the mediation apparatus 30 is started up, the OS settings, the programs for the network setting, etc., and data. The RAM 104 is a volatile semiconductor memory (storage device) temporarily storing a program and data. The CPU 106 is an arithmetic device to control the entire mediation apparatus 30 and achieve the equipped functions by loading a program and data onto the RAM and executing the processes.

According to this embodiment, by having such a hardware configuration as described above, the mediation apparatus 30 can provide various processing services. For example, by executing various control programs stored in the ROM 102 by the CPU 106, the entire mediation apparatus 30 can be controlled.

The process of the policy determination section 33 of the mediation apparatus 30 is realized by executing a program stored in the HDD 108 by the CPU 106. Further, the level definition table 42 and the security setting table 44 can be stored in the RAM 104, the HDD 108, or a storage device connected via the company network 20 and the Internet 60.

The security management system, an input apparatus, and a security management method are described with reference to embodiments. However, the present invention is not limited to the embodiments. Namely, various modifications or improvements may be achieved without departing from the scope of the present invention. Also, as long as it is consistent, it is possible to combine any of the embodiments and modified examples described above.

The system configurations according to the embodiments and modified examples thereof as described above are examples only. It is obvious that there exist various modified configurations depending on the purposes and applications.

For example, the level definition table 42 and the conference room corresponding table 80 may be defined so as to be in association with the users using the apparatuses. In this case, it becomes possible to set and update the security levels for each of the users using the apparatuses.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A security management system managing security of plural types of client apparatuses mutually connected to each other via a network, the security management system comprising:
 a management apparatus including first processing circuitry configured to
  acquire or receive information used to change a security level of any of the client apparatuses;
  determine a specific client apparatus whose security setting value is to be changed and a security setting value to be applied to the specific client apparatus, in response to the acquired or received information, based on a definition table defining the security levels of the plural types of client apparatuses; and
  notify the specific client apparatus of the security setting value to be applied to the specific client apparatus; and
 a client apparatus including second processing circuitry configured to
  receive, from a local transmitter, location specifying information indicating a location of the client apparatus; and
  determine, based on the received location specifying information and a type of the client apparatus, the location of the client apparatus and at least one security setting value to be used by the client apparatus, the at least one security setting value including a user authentication level and an encryption strength to be used by the client apparatus while in the determined location.

2. The security management system according to claim 1, wherein the definition table defines the security levels of the plural types of client apparatuses in association with users who use the client apparatuses.

3. The security management system according to claim 1, wherein the first processing circuitry is further configured to acquire or receive the information used to change the security level in accordance with a user's operation in response to a screen displaying the security setting values of the plural types of client apparatuses defined in the definition table or a screen displaying security policies indicating the security setting values of the plural types of client apparatuses defined in the definition table.

4. The security management system according to claim 1, wherein the first processing circuitry is further configured to acquire or receive the information used to change the security level based on a state change of a position of the any of the client apparatuses.

5. The security management system according to claim 1, wherein the first processing circuitry is further configured to:
 register the security setting values of the plural types of the client apparatuses into a setting table, and
 determine the specific client apparatus, whose security setting value to be changed defined in the definition table differs from the security setting value registered in the setting table, and a security setting value to be applied to the specific client apparatus.

6. The security management system according to claim 1, wherein the first processing circuitry is further configured to notify the specific client apparatus of the determined security setting value to be applied to the specific client apparatus when a permission is received from the management apparatus.

7. The security management system according to claim 1, wherein the first processing circuitry is further configured to change the security setting value of any of the plural client apparatuses based on at least a part of the information used to change the acquired security level based on a user's selection or a desired security level to be applied thereto.

8. The security management system according to claim 1, wherein the plural types of client apparatuses are configured to store the definition table, which stores the security setting values of the plural types of client apparatuses in association with positions thereof for each of the plural types so as to change the security levels of the client apparatuses based on the positions thereof.

9. An input apparatus configured to input information which is used to change the security level of any of client apparatuses which are mutually connected via a network in accordance with a user's operation in response to a screen displaying the security setting values of the plural types of client apparatuses defined in the definition table according to claim 1 or a screen displaying security policies indicating the security setting values of the plural types of client apparatuses defined in the definition table.

10. A security management method of managing security of plural types of client apparatuses mutually connected to each other via a network, the security management method comprising:
 acquiring or receiving information used to change a security level of any of the client apparatuses;
 determining a specific client apparatus whose security setting value is to be changed and a security setting value to be applied to the specific client apparatus, in response to the acquired or received information, based on a definition table defining the security levels of the plural types of client apparatuses;
 notifying the specific client apparatus of the security setting value to be applied to the specific client apparatus;
 receiving, from a local transmitter by a given client apparatus, location specifying information indicating a location of the given client apparatus; and
 determining, based on the received location specifying information and a type of the given client apparatus, the location of the given client apparatus and at least one security setting value to be used by the given client apparatus, the at least one security setting value including a user authentication level and an encryption strength to be used by the given client apparatus while in the determined location.

11. A non-transitory computer-readable recording medium having stored herein a program for causing a computer to execute a security management method of managing security of plural types of client apparatuses mutually connected to each other via a network, the security management method comprising:
 acquiring or receiving information which is used to change a security level of any of the client apparatuses;
 determining a specific client apparatus whose security setting value is to be changed and a security setting value to be applied to the specific client apparatus, in response to the acquired or received information, based on a definition table defining the security levels of the plural types of client apparatuses;
 notifying the specific client apparatus of the security setting value to be applied to the specific client apparatus;

receiving, from a local transmitter by a given client apparatus, location specifying information indicating a location of the given client apparatus; and determining, based on the received location specifying information and a type of the given client apparatus the location of the given client apparatus and, at least one security setting value to be used by the given client apparatus, the at least one security setting value including a user authentication level and an encryption strength to be used by the given client apparatus while in the determined location.

12. The security management system of claim 1, wherein the second processing circuitry is further configured to receive, from a conference room identifier transmitter, a conference room identifier as the location specifying information.

13. The security management system of claim 1, wherein the second processing circuitry is further configured to determine the at least one security setting value by accessing a memory that stores conference room identifiers in association with policy information specifying security levels to be used by the client apparatuses in corresponding conference rooms.

14. The security management system of claim 1, wherein the second processing circuitry is configured to receive the location specifying information from the local transmitter using Bluetooth.

15. The security management system of claim 1, wherein the local transmitter is located in a conference room and the second processing circuitry is configured to receive the location specifying information when the client apparatus is located in the conference room.

16. The security management system of claim 1, wherein the client apparatus further comprises a memory storing the definition table, and the second processing circuitry of the client apparatus is configured to determine the at least one security setting value using the definition table stored in the memory of the client apparatus.

17. The security management system of claim 1, wherein the at least one security setting value includes a hard disk drive (HDD) automatic deletion level.

* * * * *